(12) United States Patent  
Morita

(10) Patent No.: US 11,195,550 B2  
(45) Date of Patent: Dec. 7, 2021

(54) SERVO WRITE HEAD, SERVO PATTERN RECORDING APPARATUS, METHOD OF PRODUCING MAGNETIC TAPE, AND MAGNETIC TAPE

(71) Applicant: Sony Corporation, Tokyo (JP)

(72) Inventor: Hiroshi Morita, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/964,327

(22) PCT Filed: Nov. 12, 2019

(86) PCT No.: PCT/JP2019/044306  
§ 371 (c)(1),  
(2) Date: Jul. 23, 2020

(87) PCT Pub. No.: WO2020/110702  
PCT Pub. Date: Jun. 4, 2020

(65) Prior Publication Data  
US 2021/0280211 A1 Sep. 9, 2021

(30) Foreign Application Priority Data  
Nov. 29, 2018 (JP) .............................. JP2018-223699

(51) Int. Cl.  
*G11B 5/09* (2006.01)  
*G11B 5/584* (2006.01)  
*G11B 5/008* (2006.01)

(52) U.S. Cl.  
CPC .......... *G11B 5/584* (2013.01); *G11B 5/00826* (2013.01)

(58) Field of Classification Search  
None  
See application file for complete search history.

(56) References Cited

U.S. PATENT DOCUMENTS 5,689,384 A 11/1997 Albrecht et al.  
6,188,532 B1 * 2/2001 Albrecht ............ G11B 5/00878  
360/251.1

(Continued)

FOREIGN PATENT DOCUMENTS

JP H10198918 A 7/1998  
JP 2000285427 A 10/2000

(Continued)

OTHER PUBLICATIONS

International Search Report issued in Application No. PCT/JP2019/044306, dated Dec. 24, 2019.

*Primary Examiner* — Peter Vincent Agustin  
(74) *Attorney, Agent, or Firm* — K&L Gates LLP

(57) ABSTRACT

[Object] To provide a technology of a servo write head and the like capable of improving the recording accuracy of a servo pattern.  
[Solving Means] A servo write head according to the present technology includes a recording surface. This recording surface has a first region and a second region, and records a servo pattern on a magnetic tape by a magnetic gap, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

17 Claims, 16 Drawing Sheets

(56) References Cited

U.S. PATENT DOCUMENTS

| | | | |
|---|---|---|---|
| 2001/0015870 A1* | 8/2001 | Saliba | G11B 5/10 360/122 |
| 2010/0073816 A1* | 3/2010 | Komori | G11B 5/3106 360/110 |
| 2014/0268414 A1 | 9/2014 | Nakashio et al. | |
| 2021/0056986 A1* | 2/2021 | Yamaga | G11B 5/584 |

FOREIGN PATENT DOCUMENTS

| | | | | |
|---|---|---|---|---|
| JP | 2006127730 A | * | 5/2006 | G11B 5/1871 |
| JP | 2006127730 A | | 5/2006 | |
| JP | 2014199706 A | | 10/2014 | |

* cited by examiner

SERVO WRITE HEAD, SERVO PATTERN RECORDING APPARATUS, METHOD OF PRODUCING MAGNETIC TAPE, AND MAGNETIC TAPE

TECHNICAL FIELD

The present technology relates to a technology of a servo write head that records a servo pattern on a magnetic tape, and the like.

BACKGROUND ART

In recent years, magnetic tapes have been widely used for application such as backup of electronic data. The magnetic tapes are attracting increasing attention as a storage medium of big data or the like because it has a large capacity and can be preserved for a long time.

In the magnetic tape, a plurality of data bands including a plurality of recording tracks, and a plurality of servo bands including a plurality of stripe-shaped servo patterns are provided. In the magnetic tape, a servo pattern is recorded on the servo band first by the servo write head of the servo pattern recording apparatus (see, for example, Patent Literature 1).

After that, a head unit of a data recording/reproduction apparatus reads the servo pattern in the servo band, alignment with the recording tracks in the data band is performed, and data is recorded on the recoding tracks.

In recent years, the number of recording tracks tends to significantly increase due to the demand for high-density recording on the magnetic tape. For example, the number of recording tracks of the magnetic tape of the LTO (Linear Tape Open) standard is 384 in the first LTO-1, but has increased to 512, 704, 896, 1280, 2176, 3584, and 6656 in LTO-2 to LTO8, respectively.

CITATION LIST

Patent Literature

Patent Literature 1: Japanese Patent Application Laid-open No. 2014-199706

DISCLOSURE OF INVENTION

Technical Problem

Since the alignment with respect to the recording tracks is performed on the basis of the servo pattern, it is necessary to improve, in the case where the number of recording tracks has increased, the recording accuracy of the servo pattern accordingly. Meanwhile, the recording accuracy of the servo pattern is lowered due to the friction between the servo write head and the magnetic tape in some cases.

In view of the circumstances as described above, it is an object of the present technology to provide a technology of a servo write head and the like capable of improving the recording accuracy of a servo pattern.

Solution to Problem

A servo write head according to the present technology includes a recording surface. This recording surface has a first region and a second region, and records a servo pattern on a magnetic tape by a magnetic gap, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

In this technology, since the second width in the recording surface is narrower than the first width in the recording surface, it is possible to reduce the friction between the recording surface of the servo write head and the magnetic tape. As a result, it is possible to make the flow of the magnetic tape with respect to the recording surface smooth, and thus, improve the recording accuracy of the servo pattern.

In the above-mentioned servo write head, the second region may be formed such that the recording surface is notched in a predetermined shape in the width direction.

In the above-mentioned servo write head, the predetermined shape may be an arc.

In the above-mentioned servo write head, the second width corresponding to a part of the second region having the narrowest width may be 0.8 times or less the first width.

In the above-mentioned servo write head, the second width corresponding to the part of the second region having the narrowest width may be 0.6 times or less the first width.

In the above-mentioned servo write head, the second width corresponding to the part of the second region having the narrowest width may be 0.4 times or less the first width.

In the above-mentioned servo write head, the second width corresponding to the part of the second region having the narrowest width may be 0.3 times or less the first width.

In the above-mentioned servo write head, a curvature radius of the arc may be 4.1 times or less the first width.

In the above-mentioned servo write head, the curvature radius of the arc may be 2.2 times or less the first width.

In the above-mentioned servo write head, the curvature radius of the arc may be 2.1 times or less the first width.

In the above-mentioned servo write head, the curvature radius of the arc may be 1.5 times or less the first width.

In the above-mentioned servo write head, the predetermined shape may be an arc continuous in the longitudinal direction.

In the above-mentioned servo write head, the predetermined shape may be a rectangle.

In the above-mentioned servo write head, the magnetic tape may at least partially float above the second region.

In the above-mentioned servo write head, the magnetic tape may at least partially float above the second region while being in contact with the first region.

A servo pattern recording apparatus according to the present technology includes a servo write head. This servo write head has a recording surface that has a first region and a second region, and records a servo pattern on a magnetic tape by a magnetic gap, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

A method of producing a magnetic tape according to the present technology includes recording a servo pattern on a magnetic tape by a magnetic gap in a recording surface of a servo write head, the recording surface having a first region and a second region, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

On a magnetic tape according to the present technology, a servo pattern is recorded by a magnetic gap in a recording surface of a servo write head, the recording surface having a first region and a second region, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

MODE(S) FOR CARRYING OUT THE INVENTION

Hereinafter, an embodiment of the present technology will be described with reference to the drawings.

<Magnetic Tape 1>

Figure 1:
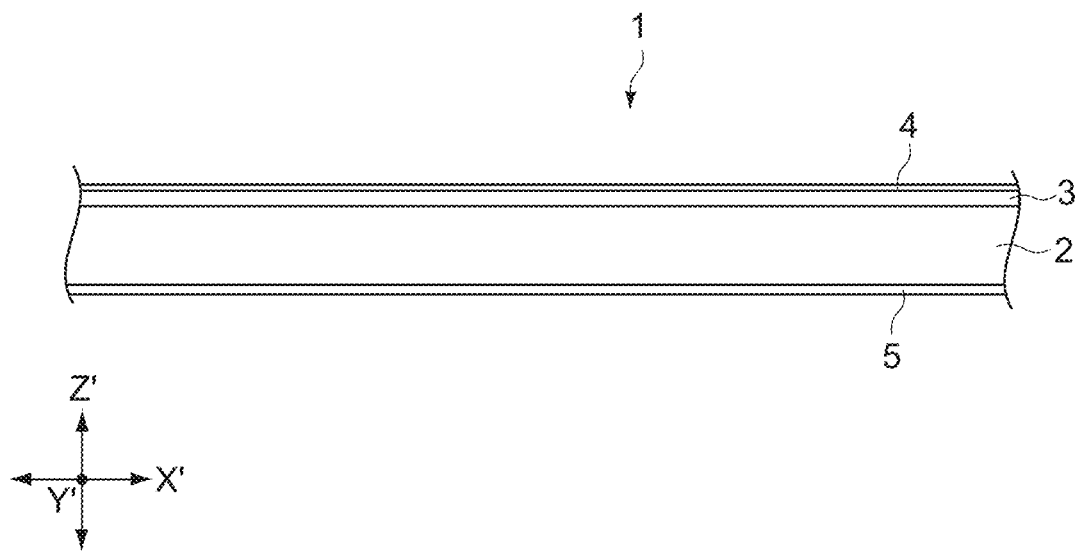
FIG. 1 is a schematic diagram of a magnetic tape as viewed from the side.
Figure 2:
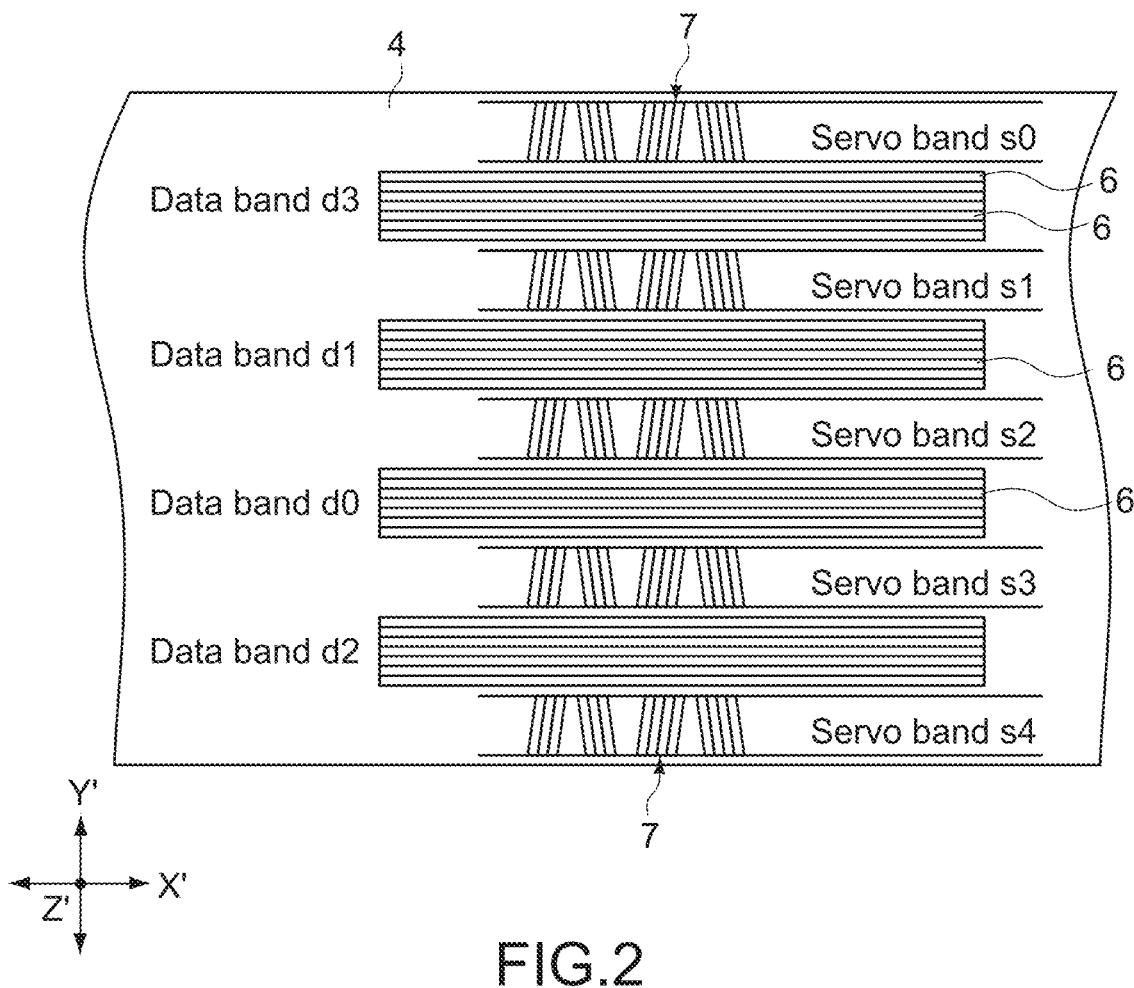
FIG. 2 is a schematic diagram of the magnetic tape as viewed from the above.

A basic configuration of a magnetic tape 1 according to an embodiment of the present technology will be described. FIG. 1 is a schematic diagram showing the magnetic tape 1 as viewed from the side, and FIG. 2 is a schematic diagram of the magnetic tape 1 as viewed from the above. Note that in the drawings, an orthogonal coordinate system based on the magnetic tape 1 is represented by an X'Y'Z' coordinate system.

As shown in FIG. 1 and FIG. 2, the magnetic tape 1 has a tape shape that is long in the longitudinal direction (X' axis direction), short in the width direction (the Y' axis direction), and thin in the thickness direction (Z' axis direction).

The magnetic tape 1 includes a tape-shaped base material 2 that is long in the longitudinal direction (X' axis direction), a non-magnetic layer 3 provided on one main surface of the base material 2, a magnetic layer 4 provided on the non-magnetic layer 3, and a back layer 5 provided on the other main surface of the base material 2. Note that the back layer 5 only needs to be provided as necessary, and this back layer 5 may be omitted.

The base material 2 is a non-magnetic support that supports the non-magnetic layer 3 and the magnetic layer 4. The base material 2 contains, for example, at least one of polyesters, polyolefins, cellulose derivatives, vinyl resins, or other polymer resins.

The magnetic layer 4 is a recoding layer for recording data. This magnetic layer 4 contains a magnetic powder, a binder, conductive particles, and the like. The magnetic layer 4 may further contain an additive such as a lubricant, an abrasive, and a rust inhibitor as necessary.

The magnetic layer 4 may be vertically oriented, or longitudinally oriented. The magnetic powder contained in the magnetic layer 4 includes, for example, nanoparticles (ε-iron oxide particles) containing ε-iron oxide, nanoparticles (hexagonal ferrite particles) containing hexagonal ferrite, nanoparticles (cobalt ferrite) containing Co-containing spinel ferrite, or the like.

The non-magnetic layer 3 contains a non-magnetic powder and a binder. The non-magnetic layer 3 may contain an additive such as conductive particles, a lubricant, a curing agent, and a rust inhibitor as necessary.

The back layer 5 contains a non-magnetic powder and a binder. The back layer 5 may contain an additive such as a lubricant, a curing agent, and an antistatic agent as necessary.

The upper limit of the average thickness (average total thickness) of the magnetic tape 1 is, for example, 5.6 μm or less, 5.0 μm or less, 4.4 μm or less, or the like. In the case where the average thickness of the magnetic tape 1 is 5.6 μm or less, it is possible to increase the recording capacity of a cartridge 21 as compared with that of the general magnetic tape 1.

As shown in FIG. 2, the magnetic layer 4 includes a plurality of data bands d (data bands d0 to d3) that is long in the longitudinal direction (the X' axis direction), to which data is written, and a plurality of servo bands s (servo bands s0 to s4) that is long in the longitudinal direction, to which a servo pattern 7 is written. The servo bands s are disposed at positions sandwiching the corresponding data bands d in the width direction (Y' axis direction).

In the example shown in FIG. 2, an example in which the number of data bands d is four and the number of servo bands s is five is shown. Note that the number of data bands d and the number of servo bands s can be appropriately changed.

The data bands d each include a plurality of a plurality of recording tracks 6 that is long in the longitudinal direction and aligned in the width direction. Data is recorded on the recording tracks 6 along the recording tracks 6. The 1-bit length in the longitudinal direction of the data recorded on the data bands d is, for example, 48 nm or less. The servo bands s each include the servo pattern 7 recorded by a servo pattern recording apparatus 100 (see FIG. 3).

Here, the number of recording tracks of the magnetic tape 1 of the LTO standard has increased with each generation, and the recording capacity has been dramatically improved. As an example, the number of recording tracks, which has been 384 in the first LTO-1, has increased to 512, 704, 896, 1280, 2176, 3584, and 6656 in LTO-2 to LTO8. Similarly, also the recording capacity of data, which has been 100 GB (gigabytes) in LTO-1, has increased to 200 GB, 400 GB, 800 GB, 1.5 TB (terabytes), 2.5 TB, 6.0 TB, and 12 TB in LTO-2 to LTO-8, respectively.

In this embodiment, the number of recording tracks 6 and the recording capacity are not particularly limited, and can be changed as appropriate. However, the present technology is advantageously applied to, for example, the magnetic tape 1 in which the number of recording tracks 6 and the recording capacity are large (e.g., 6656 or more, 12 TB or more: LTO8 and subsequent LTOs) and the servo pattern 7 needs to be recorded exactly accurately.

<Servo Pattern Recording Apparatus 100>

Figure 3:
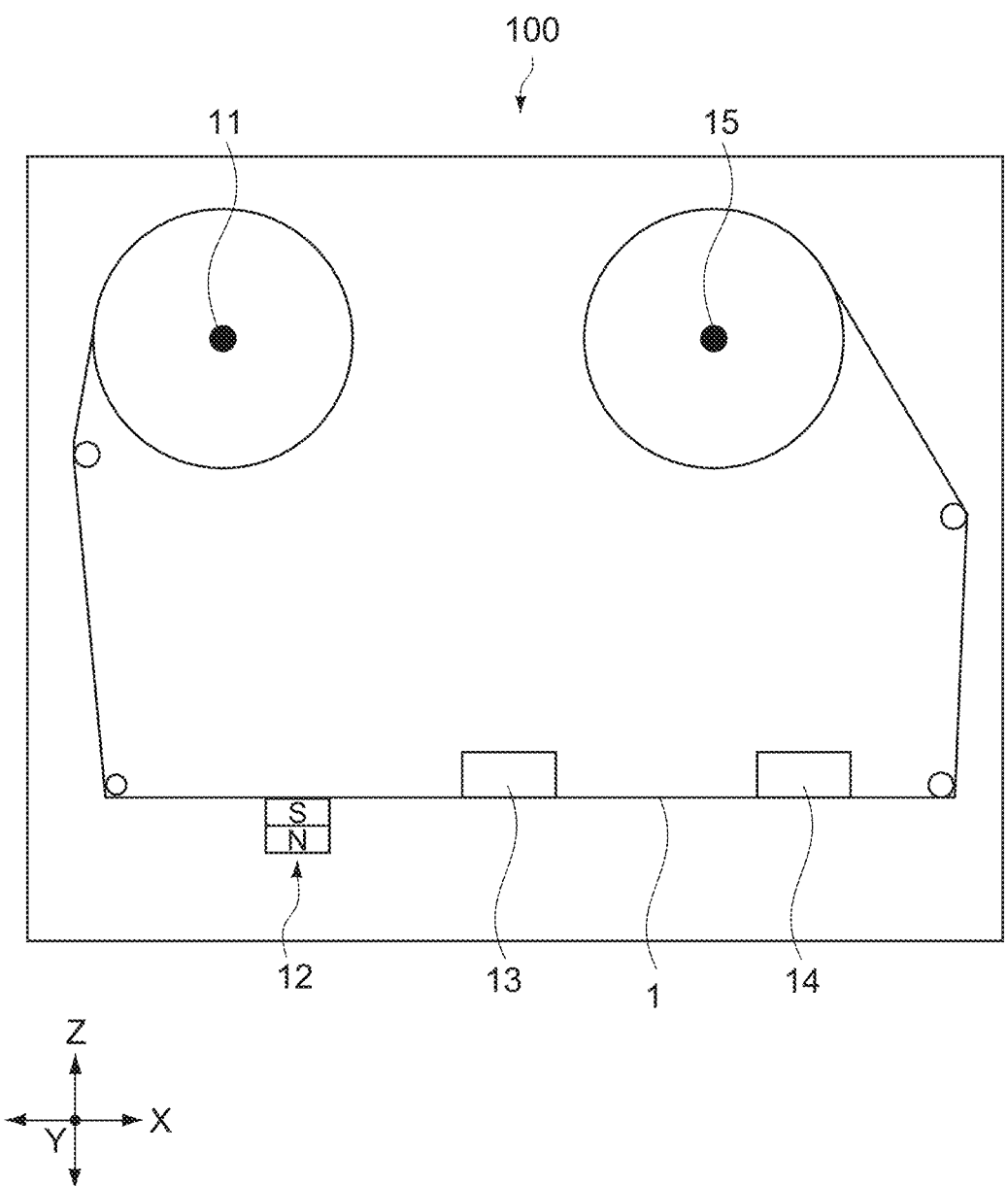
FIG. 3 is a schematic diagram showing a servo pattern recording apparatus.

Next, the servo pattern recording apparatus 100 that records the servo pattern 7 on the servo bands s of the magnetic tape 1 will be described. FIG. 3 is a schematic diagram showing the servo pattern recording apparatus 100.

As shown in FIG. 3, the servo pattern recording apparatus 100 includes a feeding roller 11, a degaussing unit 12, a servo write head 13, a servo read head 14, and a winding roller 15 in the order from the upstream side of the transport direction of the magnetic tape 1.

The feeding roller 11 is capable of rotatably supporting the roll-shaped magnetic tape 1. The feeding roller 11 is caused to rotate in accordance with driving of a drive source such as a motor, and feeds the magnetic tape 1 toward the downstream side in accordance with the rotation.

The winding roller 15 is capable of rotatably supporting the roll-shaped magnetic tape 1. The winding roller 15 rotates in synchronization with the feeding roller 11 in accordance with driving of a drive source such as a motor, and winds up the magnetic tape 1 in accordance with the rotation.

The feeding roller 11 and the winding roller 15 are capable of causing the magnetic tape 1 to move in the transportation path at a constant speed.

The servo write head 13 is disposed, for example, on the upper side of the magnetic tape 1 (on the side of the magnetic layer 4). The servo write head 13 generates a magnetic field at a predetermined timing in accordance with a square wave pulse signal, and applies a magnetic field to a part of the magnetic layer 4 of the magnetic tape 1.

As a result, the servo write head 13 magnetizes a part of the magnetic layer 4 to record the servo pattern 7 on the magnetic layer 4. The servo write head 13 is capable of recording the servo pattern 7 on each of the five servo bands s0 to s4 when the magnetic tape 1 passes under the servo write head 13.

The degaussing unit 12 is disposed, for example, on the lower side of the magnetic tape 1 (on the side of the base material 2) on the upstream side of the servo write head 13. The degaussing unit 12 includes a permanent magnet. The permanent magnet applies, before the servo write head 13 records the servo pattern 7, a magnetic field to the entire magnetic layer 4 by a DC magnetic field to demagnetize the entire magnetic layer 4.

The servo read head 14 is disposed on the upper side of the magnetic tape 1 (on the side of the magnetic layer 4) on the downstream side of the servo write head 13. The servo read head 14 is configured to be capable of reproducing a servo signal by reading, by an MR element (MR: Magneto Resistive), a GMR element (GMR: Giant Magneto Resistive), a TMR element (TMR: Tunnel Magneto Resistive), an inductive head or the like, a magnetic field generated from the servo pattern 7 recorded on the magnetic tape 1. The reproduced waveform of the servo signal read by the servo read head 14 is used to check whether or not the servo pattern 7 is accurately recorded.

Note that although illustration is omitted, the servo pattern recording apparatus 100 includes a control device that integrally controls respective units of the servo pattern recording apparatus 100.

The control device includes, for example, a control unit, a storage unit, a communication unit, and the like. The control unit includes, for example, a CPU (Central Processing Unit), and integrally controls the respective units of the servo pattern recording apparatus 100 in accordance with the program stored in the storage unit.

The storage unit includes a non-volatile memory on which various types of data and various programs are to be recorded, and a volatile memory used as a work area of the control unit. The above-mentioned various programs may be read from a portable recording medium such as an optical disc and a semiconductor memory, or may be downloaded from a server apparatus on a network. The communication unit is configured to be capable of communicating with another apparatus such as a server apparatus.

[Basic Idea of Present Technology]

Here, in this embodiment, the servo write head 13 is particularly characterized. Before describing this servo write head 13, the basic idea of the present technology will be simply described.

Alignment with the recording tracks 6 in the data band d is performed on the basis of the servo pattern 7 in the servo band s. For this reason, in the case where the number of recording tracks increases, it is necessary to improve the recording accuracy of the servo pattern 7 accordingly. Regarding the number of recording tracks, it is necessary to prepare 6656 recording tracks 6 in LTO8 and the number of tracks is expected to further increase in LTO9 and subsequent LTOs. Therefore, in such a case, it is necessary to record the servo pattern 7 exactly accurately (e.g., in nano order).

Meanwhile, in the case of a general servo write head, the recording accuracy of the servo pattern 7 is reduced due to the friction between the servo write head and the magnetic tape 1 in some cases. When the present inventors have actually frequency-analyzed the reproduced waveform of the servo pattern 7 written by a general servo write head, it has been confirmed that there is an error in a particular frequency region due to the friction.

In the case where the number of recording tracks increases, it is necessary to eliminate such an error due to the friction. For this reason, in this embodiment, the influence of the friction is reduced by devising the shape of the place (a facing portion 21, a recording surface 22 described below) in the servo write head 13, which slides on the magnetic tape 1, thereby improving the recording accuracy of the servo pattern 7.

Note that the present technology is advantageously applied to recoding of the servo pattern 7 on the magnetic tape 1 in which the number of recording tracks 6 is large (e.g., 6656 or more: LTO8 and subsequent LTOs). However, it goes without saying that the present technology is applicable also to recording of the servo pattern 7 on the magnetic tape 1 in which the number of recording tracks is small (e.g., less than 6656).

(Servo Write Head 13)

Figure 4:
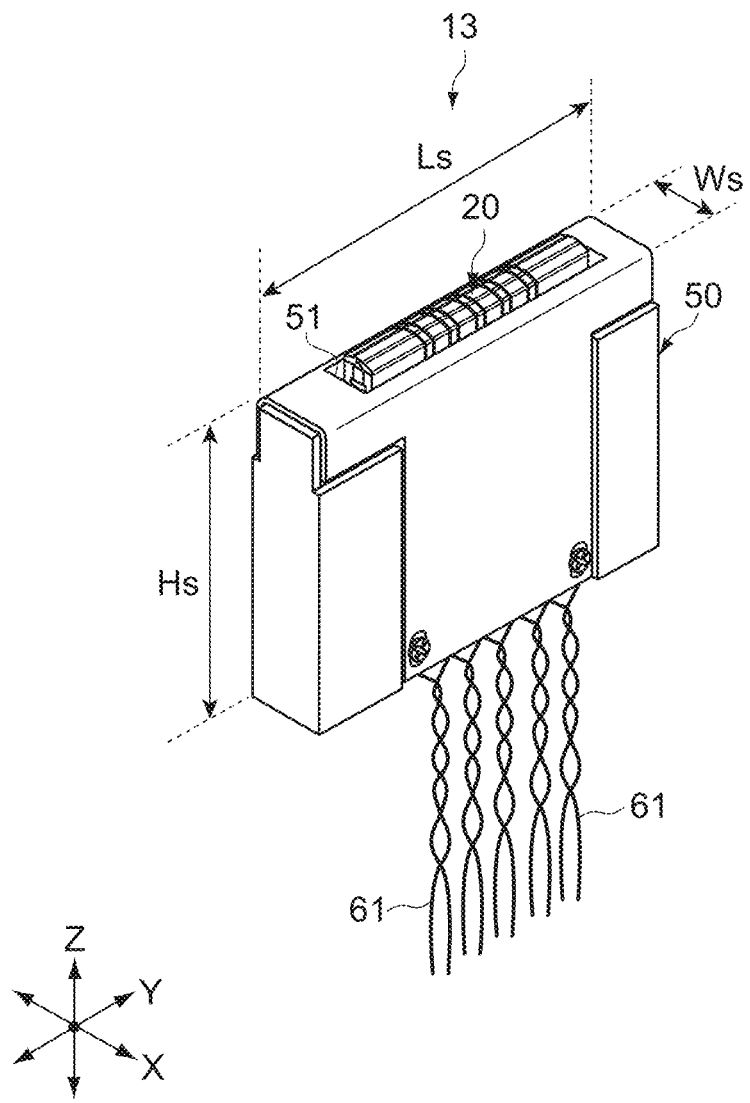
FIG. 4 is a perspective view of a servo write head as viewed from the side of the magnetic tape.
Figure 5:
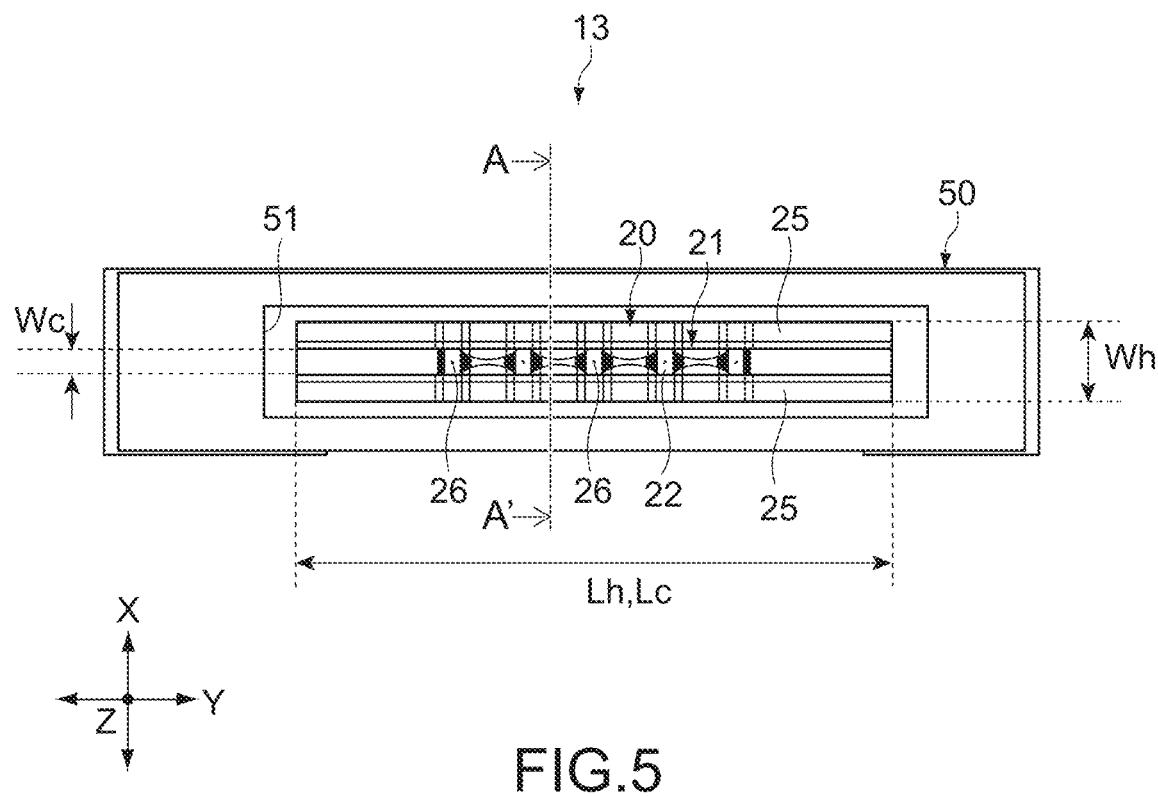
FIG. 5 is a plan view of the servo write head as viewed from the side of the magnetic tape.

Next, the specific configuration of the servo write head 13 will be described in detail. FIG. 4 is a perspective view of the servo write head 13 as viewed from the side of the magnetic tape 1. FIG. 5 is a plan view of the servo write head 13 as viewed from the side of the magnetic tape 1.

Figure 6:
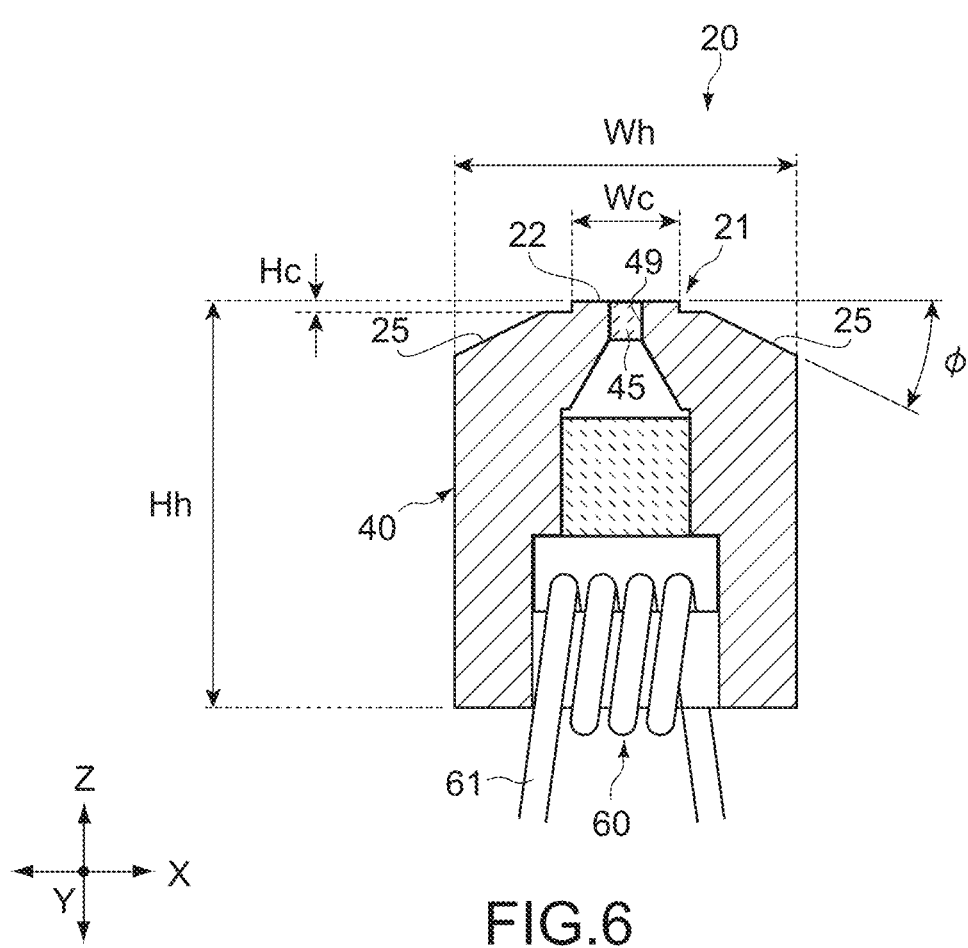
FIG. 6 is a cross-sectional view taken along the line A-A' shown in FIG. 5.
Figure 7:
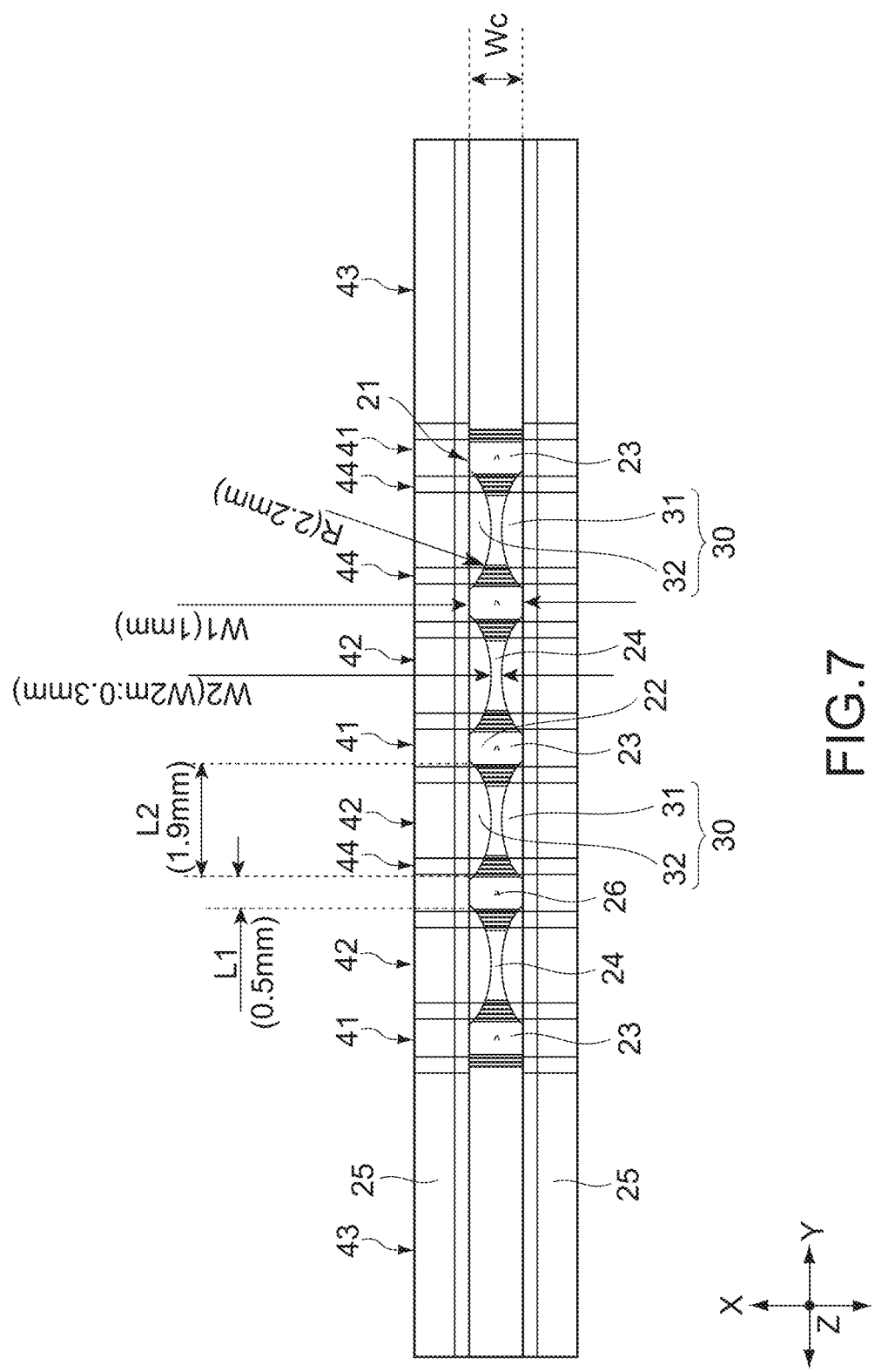
FIG. 7 is a partial enlarged view of the servo write head as viewed from the side of the magnetic tape.
Figure 8:
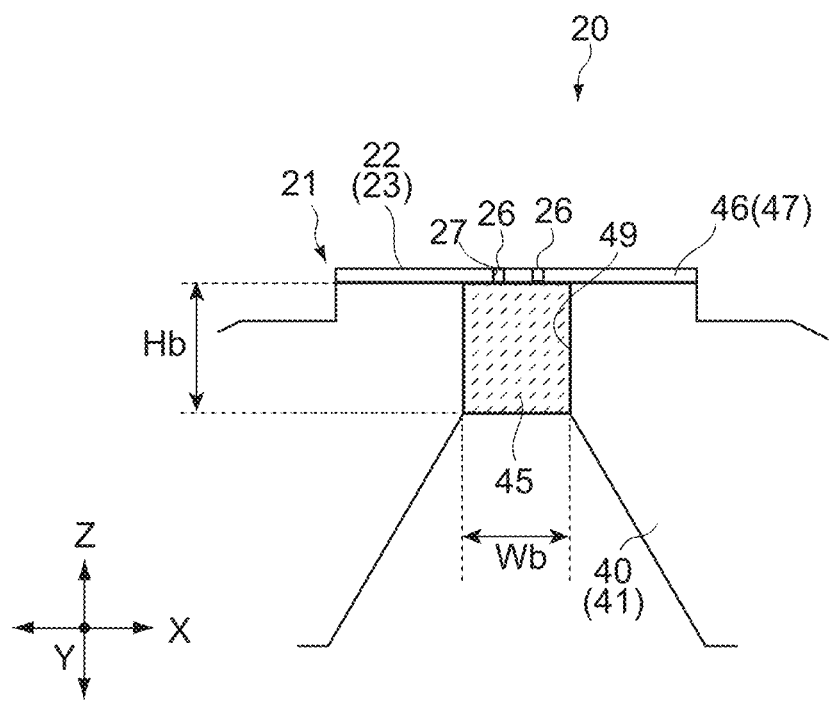
FIG. 8 is a schematic partial enlarged view of the upper part of the servo write head as viewed from the side.
Figure 9:
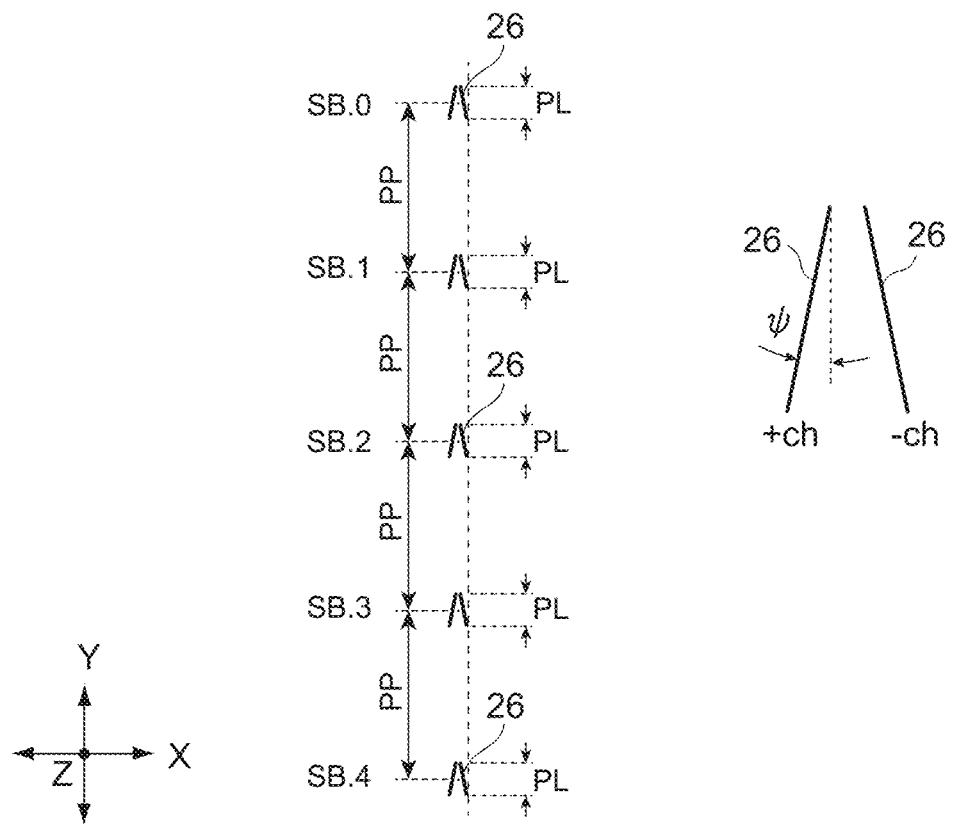
FIG. 9 is a schematic diagram showing a magnetic gap provided in the servo write head.

Further, FIG. 6 is a cross-sectional view taken along the line A-A' shown in FIG. 5. FIG. 7 is a partial enlarged view of the servo write head 13 as viewed from the side of the magnetic tape 1. FIG. 8 is a schematic partial enlarged view of the upper part of the servo write head 13 as viewed from the side. Further, FIG. 9 is a schematic diagram showing a magnetic gap 26 provided in the servo write head 13.

Note that in each of the drawings described in the present specification, an orthogonal coordinate system based on the servo write head 13 (a head block 20, a dummy 70) is represented by an XYZ coordinate system.

In the servo write head 13, the longitudinal direction (Y axis direction) corresponds to the width direction (Y' axis direction) of the magnetic tape 1, and the width direction (X axis direction) corresponds to the longitudinal direction (X' axis direction) of the magnetic tape 1 and the travelling direction of the magnetic tape 1. Further, in the servo write head 13, the height direction (Z axis direction) corresponds to the thickness direction (Z' axis direction) of the magnetic tape 1.

As shown in the figures, the servo write head 13 includes the head block 20, the shield case 50, and a plurality of coils 60.

The shield case 50 shields the magnetic field generated from the coils 60 of the servo write head 13 so that the magnetic field from the coils 60 does not affect other external parts. Further, the shield case 50 shields the magnetic field generated from the other external parts so that the magnetic field from the outside does not affect the coils 60.

The shield case 50 has a hollow rectangular shape, which is long in the longitudinal direction (Y axis direction), short in the width direction (X axis direction), and high in the height direction (Z axis direction) (see, particularly, FIG. 4 and FIG. 5). In this embodiment, the shield case 50 has a length Ls (in the Y axis direction) of 38 mm, a width Ws (in the X axis direction) of 6.4 mm, and a height Hs (in the Z axis direction) of 30 mm. Note that the specific dimension of each member, the number of members, and the like mentioned in the present specification are merely examples, and can be changed as appropriate.

An opening 51 for exposing the head block 20 from the shield case 50 is provided on the upper part of the shield case 50. Further, an opening for drawing out a conducting wire 61 connected to the coil 60 to the outside of the shield case 50 is provided on the lower side of the shield case 50.

The head block 20 is formed to be long in the longitudinal direction (Y axis direction), and formed in an inverted U-shape (partially cylindrical shape) in which the upper part (on the side of the magnetic tape 1) is curved as viewed from the longitudinal direction (see, particularly, FIG. 5 to FIG. 7). In this embodiment, the head block 20 has a length Lh (in the Y axis direction) of 24 mm, a width Wh (in the X axis direction) of 3.2 mm, and a height Hh (in the Z axis direction) of 3.8 mm.

The facing portion 21 facing the magnetic tape 1 is provided along the longitudinal direction (Y axis direction) in the vicinity of the center in the width direction (X axis direction) of the upper part of the head block 20. This facing portion 21 is provided in the head block 20 so as to protrude above (toward the side of the magnetic tape 1) by one step than other portions in the upper part of the head block 20.

In this embodiment, the facing portion 21 has a length Lc (in the Y axis direction) of 24 mm, a width Wc (in the X axis direction) of 1 mm, and a height Hc (in the Z axis direction) of 0.1 mm.

In the upper part of the head block 20, two tapered surfaces 25 that are inclined in the directions opposite to the horizontal surface are provided at positions sandwiching the facing portion 21 in the width direction. An angle φ at which the tapered surfaces 25 are inclined with respect to the horizontal surface is 25° in this embodiment.

The surface of the facing portion 21 is made flat. This surface of the facing portion 21 will be referred to as the recording surface 22 in the present specification. This recording surface 22 faces the travelling magnetic tape 1 and records the servo pattern 7 on the magnetic tape 1 by the magnetic gap 26 provided in the recording surface 22.

In this embodiment, in order to reduce the friction between the servo write head 13 and the magnetic tape 1, the shape of the recording surface 22 (shape of the facing portion 21) is made different from a normal shape. In this embodiment, this shape of the recording surface 22 (shape of the facing portion 21) makes it possible to cause the magnetic tape 1 to be in contact with a part (first region 23) of the recording surface 22 and prevent the magnetic tape 1 from being in contact with another portion (second region 24) of the recording surface 22.

Note that the recording surface 22 is a sliding surface, which slides on the magnetic tape 1, but not all of the recording surface 22 is a sliding surface in this embodiment because the magnetic tape 1 is partially separated from the recording surface 22. Further, in the upper part of the head block 20, the portions other than the recording surface 22, e.g., the tapered surfaces 25, are not in contact with the magnetic tape 1 in order to reduce the friction.

A plurality of sets of magnetic gaps 26 is provided on the recording surface 22 along the longitudinal direction (Y axis direction) at predetermined intervals (see, particularly, FIG. 9). The set of magnetic gaps 26 includes two magnetic gaps 26 ("/" and "\") disposed with a predetermined azimuth angle ψ so as to be inclined in directions opposite to each other. The azimuth angle ψ is, for example, 12°±3°. Further, a length PL (in the Y axis direction) of the magnetic gap 26 is, for example, 96 μm±3 μm, and the gap width (in the X axis direction) that is the width of the magnetic gap 26 itself is, for example, 0.9 μm.

The number of sets of magnetic gaps 26 corresponds to the number of servo bands s in the magnetic tape 1, and the number of sets of the magnetic gaps 26 is five in this embodiment. Further, in this five sets of magnetic gaps 26, an interval PP in the longitudinal direction (Y axis direction) between two sets of magnetic gaps 26 adjacent to each other corresponds to the interval between the two servo bands s adjacent to each other, and this interval PP is, for example, 2858.8 μm±4.6 μm.

In the upper part of the facing portion 21, notches 30 are provided in respective (four) regions between the magnetic gaps 26 adjacent to each other in the longitudinal direction (see, particularly, FIG. 7). These four sets of notches 30 each include two notches of a first notch 31 and a second notch 32.

The first notch 31 is formed in the upper part of the facing portion 21 such that one end side in the width direction (X axis direction) is notched. Further, the second notch 32 is formed in the upper part of the facing portion 21 such that the other end side in the width direction is notched. The first notch 31 and the second notch 32 line-symmetrically with reference to the center line in the width direction of the facing portion 21 (recording surface 22).

In this embodiment, the first notch 31 and the second notch 32 are each formed in arc shape. A curvature radius R of this arc is set to 2.2 mm. Further, the depth of each of the notches 30 is 5 μm to 7 μm.

By forming the notches 30 in the upper part of the facing portion 21, the first region 23 and the second region 24 are formed on the recording surface 22. The first region 23 is formed to have a first width W1 in the width direction (X axis direction), and is a region corresponding to the position where the magnetic gap 26 is provided in the longitudinal direction (Y axis direction) perpendicular to the width direction. The second region 24 is formed to have a second width W2 narrower than the first width W1, and is a region corresponding to the position where the magnetic gap 26 is not provided in the longitudinal direction. The second region 24 is formed is formed such that the recording surface 22 is notched in a predetermined shape in the width direction.

The first region 23 and the second region 24 are alternately disposed along the longitudinal direction (Y axis direction). The number of first region 23 corresponds to the number of sets of magnetic gaps 26, and is five in this embodiment. Further, the number of second region 24 is four in this embodiment. Note that although the second region 24 is a region between the two sets of adjacent magnetic gaps 26 in this embodiment, the second region 24 may be set in a region further outside the magnetic gap 26 provided at the end in the longitudinal direction (Y axis direction).

In the first region 23 on the recording surface 22, one set of magnetic gaps 26 are provided at the center, the width W1 (first width: in the X axis direction) is 1 mm, and a length L1 (in the Y axis direction) is 0.5 mm. The width W1 (first width) of the first region 23 is the same as the width Wc of the facing portion 21.

The length L1 of the first region 23 is determined by setting a margin length (+α) with respect to the length PL (96 μm±μm) of the magnetic gap 26. This margin length is, for example, approximately 2 to 10 times the length of the magnetic gap 26. Note that in this embodiment, this margin length is approximately four times the length of the magnetic gap 26.

The width (second width W2) of the second region 24 in the recording surface 22 is narrower than the width (first width W1) of the first region 23 due to the notch 30. The width (second width W2) of the second region 24 is gradually reduced toward the center (in the longitudinal direction) of the second region 24 and is thinnest at the center thereof because the notch 30 has an arc shape. In this embodiment, a width W2$m$ of the thinnest part in the center of the second region 24 in the longitudinal direction is 0.3 mm.

In this embodiment, the width W2$m$ (0.3 mm) corresponding the part of the second region 24 having the narrowest width is 0.3 times the width (first width W1: 1 mm) of the first region 23. Note that the curvature radius R (2.2 mm) of the arc is 2.2 times the width (first width W1: 1 mm) of the first region 23.

A length L2 (in the Y axis direction) of the second region 24 is 1.9 mm. The length L2 of the second region 24 is, for example, approximately 2 to 10 times the length L1 of the first region 23. Note that in this embodiment, this length L2 of the second region 24 is approximately four times the length L1 of the first region 23.

The head block 20 includes a core portion 40 that is a core of the head block 20, a base portion 45 that is a base on which the magnetic gap 26 is formed, and a thin-film portion 46 that forms the surface of the facing portion 21 (see, particularly, FIG. 6 and FIG. 8). The thin-film portion 46 includes a metal magnetic film 47 that is provided at a position corresponding to the first region 23 in the facing portion 21, and a non-magnetic hard film provided at a position corresponding to the second region 24. Note that the above-mentioned recording surface 22 actually corresponds to the surface of each of the metal magnetic film 47 and the non-magnetic hard film (surface of the thin-film portion 46).

The core portion 40 is formed to be long in the longitudinal direction (Y axis direction), and is formed in an inverted U-shape (partially cylindrical shape: place corresponding to a first core 41 described below) in which the upper part is curved as viewed from the longitudinal direction. In this embodiment, the core portion 40 has the length Lh (in the Y axis direction) of 24 mm, the width Wh (in the X axis direction) of 3.2 mm, and the height Hh (in the Z axis direction) of 3.8 mm (which are the same as the dimension of the above-mentioned head block 20).

An opening 49 penetrating in the vertical direction is formed along the longitudinal direction (Y axis direction) in the vicinity of the center in the width direction (X axis direction) of the upper part of the core portion 40. The base portion 45 is disposed in this opening 49 so as to fill the opening 49 formed in the upper part of the core portion 40.

The base portion 45 has a shape that is long in the longitudinal direction (Y axis direction) and short in the width direction (X axis direction) and in the thickness direction (Z axis direction). In this embodiment, the base portion 45 has a length (in the Y axis direction) of 24 mm, a width Wb (in the X axis direction) of 0.33 mm, and a height Hb (in the Z axis direction) of 0.4 mm. Note that the width Wb of the base portion 45 is approximately ⅓ of the width Wc of the facing portion 21.

As the material of the base portion 45, a hard non-magnetic material having a high melting point (various glass materials, various ceramic materials) is used in consideration of various types of bonding and heat treatment to be performed for ensuring the magnetic properties of the metal magnetic film 47 during production of the head block 20.

The metal magnetic film 47 is provided in a region corresponding to the first region 23 (entire region) in the facing portion 21. The metal magnetic film 47 is formed of, for example, Fe-based microcrystal, NiFe, or, other soft magnetic alloys having high saturation magnetic flux density similar to that of Fe-based microcrystal or NiFe. Further, the thickness of the metal magnetic film 47 is several μm.

An opening 27 having a shape corresponding to that of the magnetic gap 26 is provided at a position corresponding to the magnetic gap 26 in the metal magnetic film 47. This opening 27 is provided in the metal magnetic film 47 so as to penetrate the metal magnetic film 47 in the vertical direction. A non-magnetic material is embedded in this opening 27. The upper surface of this non-magnetic material has a height that is the same as that of the surface (recording surface 22) of the metal magnetic film 47, and the lower surface of the non-magnetic material is connected to the upper surface of the base portion 45. The magnetic gap 26 is formed of this non-magnetic material embedded in the metal magnetic film 47.

In the case where the core portion 40 (first core 41) is excited by the coils 60, the non-magnetic material (magnetic gap 26) embedded in the metal magnetic film 47 blocks the magnetic flux attempting to pass through the metal magnetic film 47, and thus, a leakage magnetic field is generated at the position of the magnetic gap 26. This leakage magnetic field makes it possible to write the servo pattern 7 to the servo bands s.

The non-magnetic hard film is provided in a region corresponding to the second region 24 (entire region) in the facing portion 21. Further, the non-magnetic hard film is provided also in a region further outside the first region 23 provided at the end in the longitudinal direction (Y axis direction) in the facing portion 21. The non-magnetic hard film is formed of, for example, an $SiO_2$ film to have the same thickness as that of the metal magnetic film 47.

Note that the surface of the metal magnetic film 47 and the surface of the non-magnetic hard film (that is, the recording surface 22) have the same height, and these surfaces are flat surfaces.

The core portion 40 includes five first cores 41 corresponding to the first regions 23, four second cores 42 corresponding to the second regions 24, and two end cores 43 located on the side of both ends in the longitudinal direction (see, particularly, FIG. 7). An adhesive layer 44 is interposed between adjacent two cores of the cores 41, 42, and 43, and the cores 41, 42, and 43 are connected to each other via the adhesive layers 44.

The first core 41 is formed of a magnetic material. Meanwhile, the second core 42 and the end core 43 are each formed of a non-magnetic material. Note that by interposing the second core 42 formed of a non-magnetic material between the first cores 41, it is possible to magnetically separate the individual first cores 41.

As the magnetic material forming the first core 41, for example, a material such as single crystal ferrite and polycrystalline ferrite is used. Examples of the ferrite material include Mn—Zn-based ferrite.

As the non-magnetic material forming the second core 42 and the end core 43, a material having a thermal expansion coefficient similar to those of the first core 41 and the metal magnetic film 47 is used in consideration of various types of bonding and heat treatment to be performed for ensuring the magnetic properties of the metal magnetic film 47. For example, as the non-magnetic material, BaO—TiO2 ceramics, CaO—TnO2 ceramics, or glass ceramics having a thermal expansion coefficient similar to that of a ferrite material is used.

The second core 42 and the end core 43 are each formed in an inverted U-shape in which the lower part is opened as viewed from the longitudinal direction (see, particularly, FIG. 6). Meanwhile, although the upper part of the first core 41 has the same shape as those of the second core and the end core 43, the shape of the first core 41 is different from those of the second core 42 and the end core 43 in that the lower part is not opened and the first core 41 is formed in cylindrical shape (O-shape) as a whole.

In the lower part of each of the five first cores 41, the individual conducting wire 61 is wound in a coil shape to form the individual coil 60.

Individual pulse signals can be supplied to the five coils 60, and the five first cores 41 can be individually excited. As a result, the five first cores 41 are capable of writing the servo pattern 7 to the respective servo bands s at different timings.

Note that the thin-film portion 46 forming the surface of the facing portion 21 in the first core 41 is the metal magnetic film 47 while the thin-film portion 46 forming the surface of the facing portion 21 in the second core 42 and the end core 43 is the non-magnetic hard film.

The servo write head 13 may be movable in the height direction (Z axis direction) by a head moving mechanism (not shown). In this case, the recording surface 22 of the head block 20 can be caused to project toward the side of the magnetic tape 1, and an entering distance P (described below) toward the side of the magnetic tape 1 and wrap angle θ (described below) with respect to the magnetic tape 1 can be adjusted.

<Evaluation of Contact State Between Recording Surface 22 and Magnetic Tape 1>

Next, evaluation of the contact state between the recording surface 22 and the travelling magnetic tape 1 will be described. In this evaluation, a plurality of types of dummies 70 imitating the upper part of the head block 20 was prepared first, and then, these dummies 70 were set to an evaluation apparatus 200 to evaluate the contact state.

Figure 10:
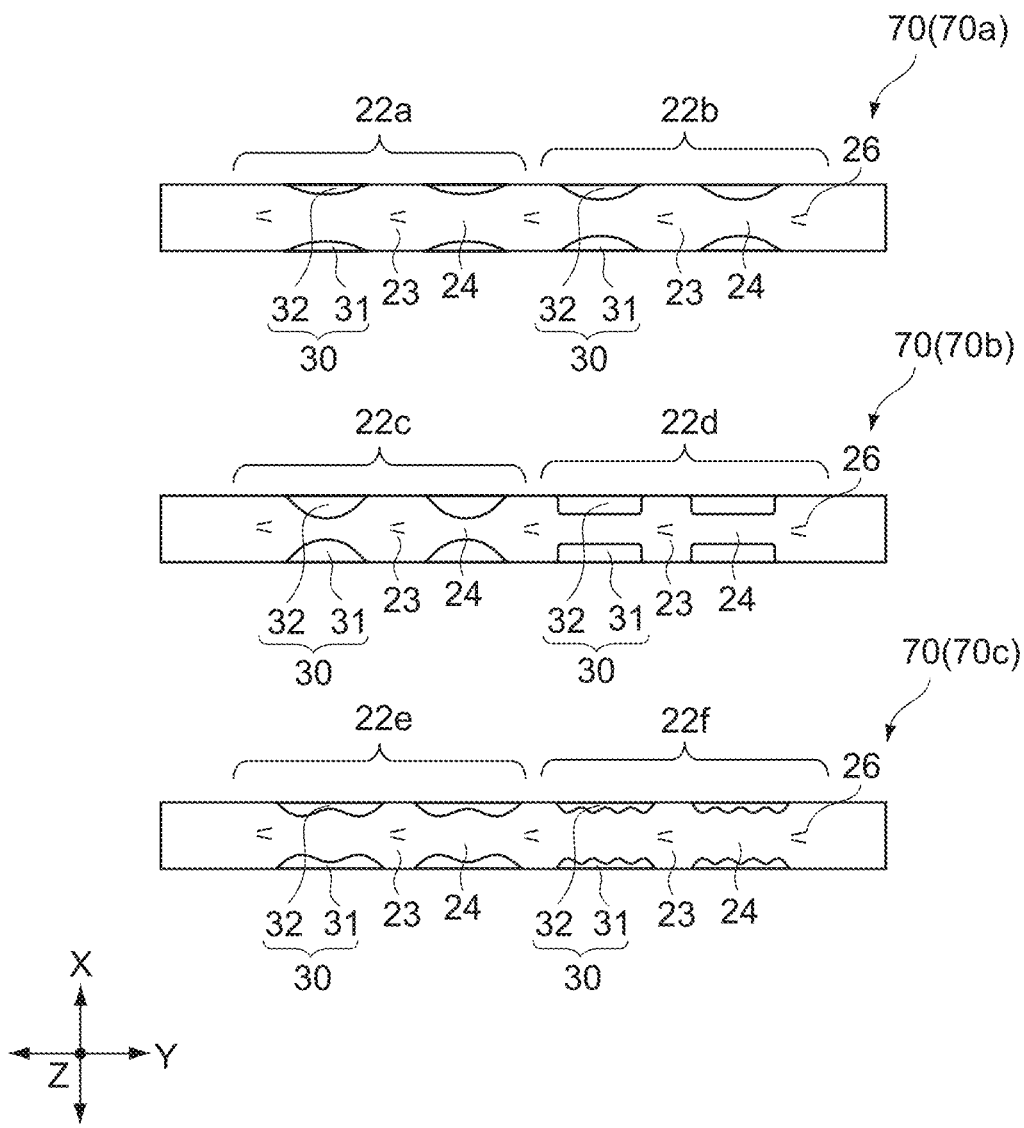
FIG. 10 is a schematic diagram showing various recording surfaces of a dummy.
Figure 11:
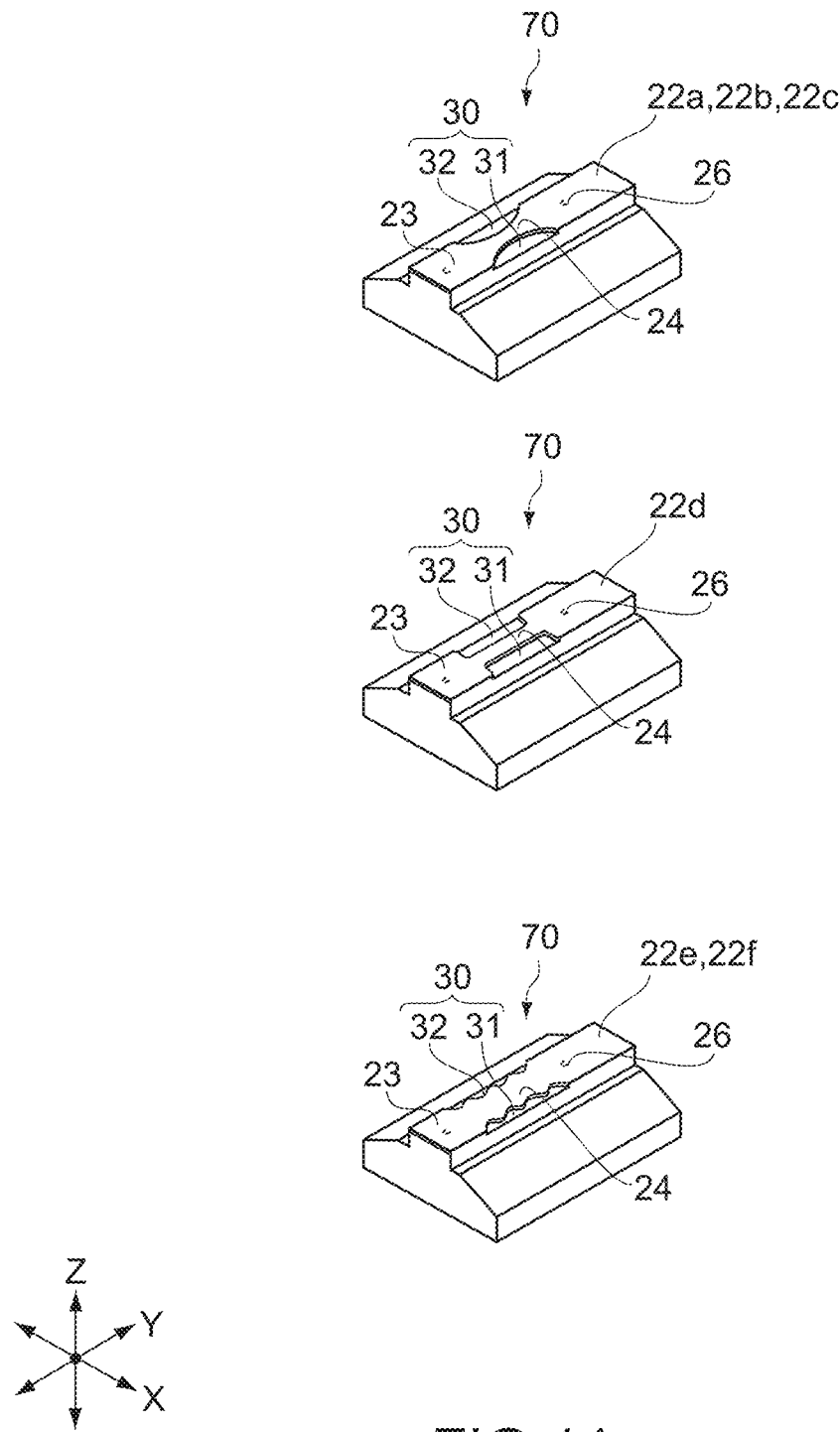
FIG. 11 is a perspective view showing a part of the dummy in the longitudinal direction.

FIG. 10 is a schematic diagram showing the recording surfaces 22 (22a to 22f) of the various dummies 70. FIG. 11 is a perspective view showing a part of the dummy 70 in the longitudinal direction.

Here, although the shape of the dummy 70 is the same as the shape of the actual upper part of the head block 20, the dummy 70 is different from the actual upper part of the head block 20 in that all parts are formed of a glass material.

The reason why the glass material is used as the material of the dummy 70 is to evaluate the contact state between the recording surface 22 and the magnetic tape 1 by the interference pattern of light. Note that in each figure including the dummy 70, the magnetic gap 26 is drawn to show the position of the magnetic gap 26, but the magnetic gap 26 is not actually provided in the dummy 70.

Three dummies 70 (70a to 70c) are shown in FIG. 10. Two different types of recording surfaces 22 (two types of notches 30) are prepared for the three dummies 70 in order to effectively evaluate the contact state (one type of recording surface 22 is selected in the actual head block 20).

The dummy 70a shown at the top of FIG. 10 has two types of recording surfaces 22, i.e., a recording surface 22a shown in the left area and a recording surface 22b shown in the right area. In the two types of recording surfaces 22a and 22b, the shape of the notch 30 for forming the second region 24 is common in arc shape (see the top of FIG. 11), but the curvature radius R of the arc, and the like differ.

Figure 15:
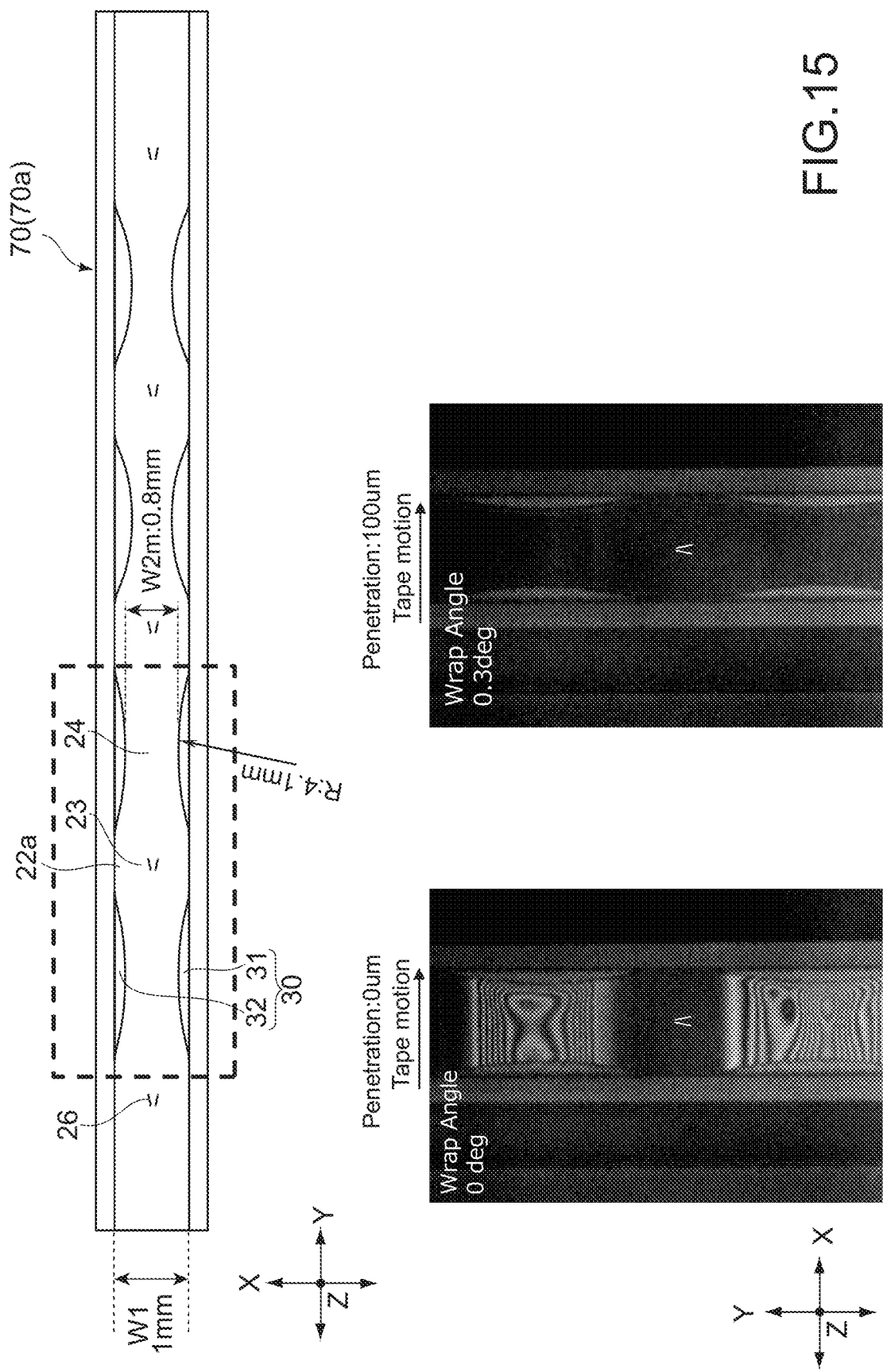
FIG. 15 is a diagram showing an image captured by an imaging unit of the evaluation apparatus.

Specifically, in the arc-shaped notch 30 in the recording surface 22a on the left side, the curvature radius R of the arc is 4.1 mm (see FIG. 15). Further, in the recording surface 22a on the left side, the width W2m of the thinnest part of the recording surface 22a in the second region 24 is 0.8 mm.

Note that in this example, the curvature radius R (4.1 mm) of the arc is 4.1 times as the width (first width W1: 1 mm) of the first region 23. Further, the width (second width W2m: 0.8 mm) corresponding to the part of the second region 24 having the narrowest width is 0.8 times as the width (first width W1: 1 mm) of the first region 23.

Figure 16:
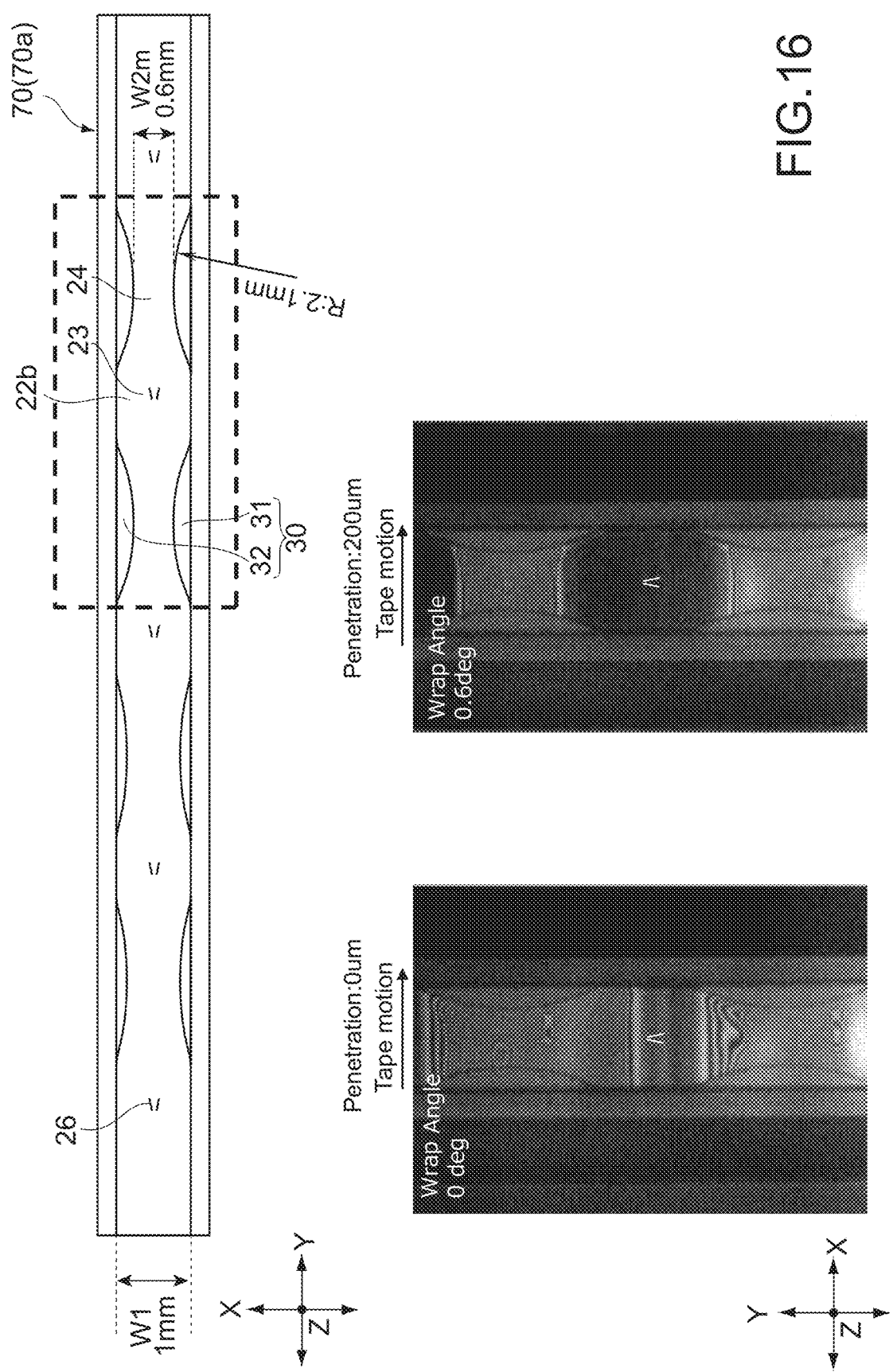
FIG. 16 is a diagram showing an image captured by the imaging unit of the evaluation apparatus.

Meanwhile, in the arc-shaped notch 30 in the recording surface 22b on the right side, the curvature radius R of the arc is 2.1 mm (see FIG. 16). Further, in the recording surface 22b on the right side, the width W2m of the thinnest part of the recording surface 22b in the second region 24 is 0.6 mm.

Note that in this example, the curvature radius R (2.1 mm) of the arc is 2.1 times the width (first width W1: 1 mm) of the first region 23. Further, the width (second width W2m: 0.6 mm) according to the part of the second region 24 having the narrowest width is 0.6 times the width (first width W1: 1 mm) of the first region 23.

Also the dummy 70b in the center of FIG. 10 has two types of recording surfaces 22, i.e., a recording surface 22c shown in the left area and a recording surface 22d shown on the right area. In the recording surface 22c on the left side, the notch 30 for forming the second region 24 has an arc shape (see the top of FIG. 11). In the recording surface 22d on the right side, the notch 30 for forming the second region 24 has a rectangular shape (see the center of FIG. 11).

Figure 17:
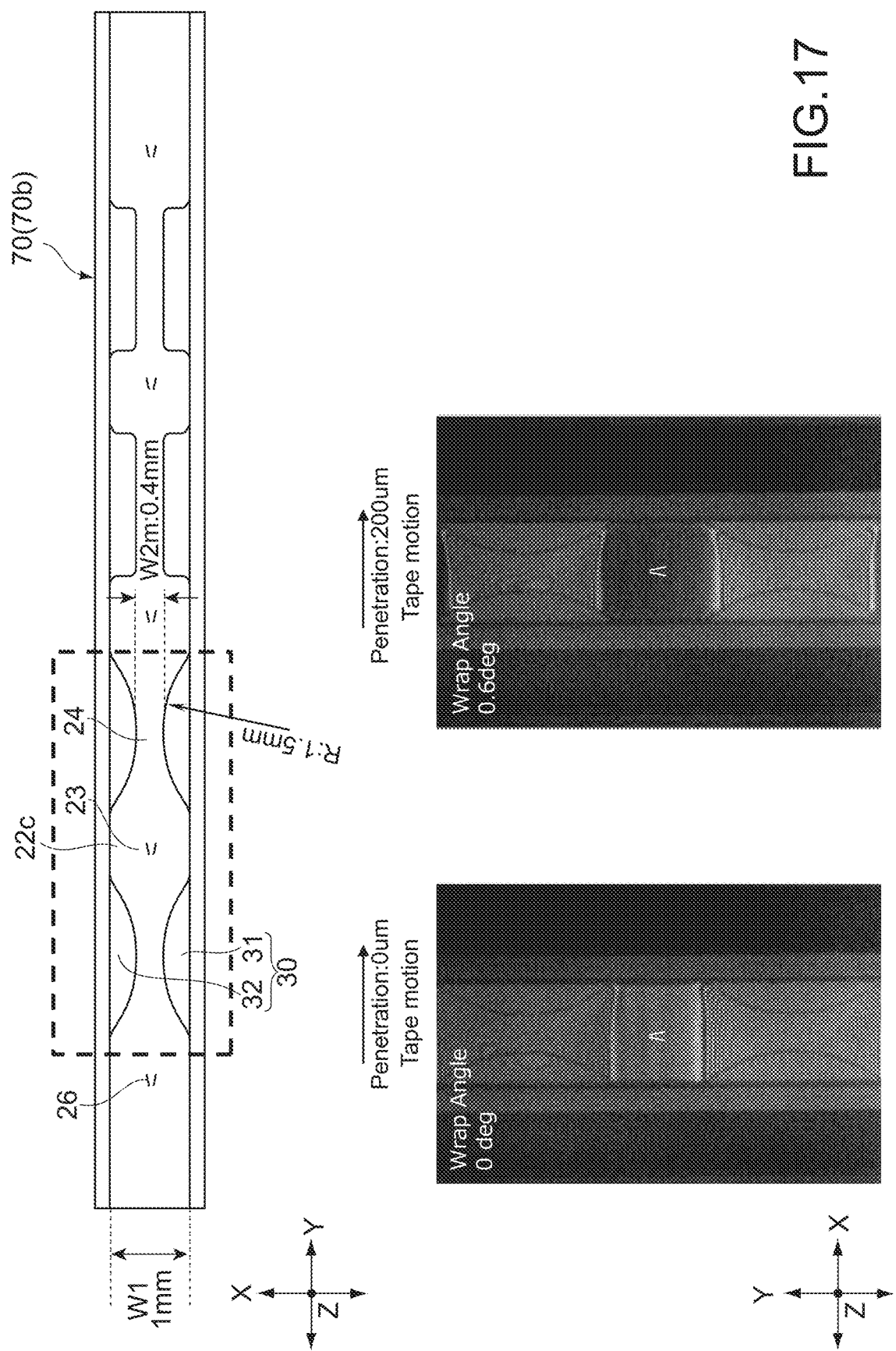
FIG. 17 is a diagram showing an image captured by the imaging unit of the evaluation apparatus.

In the arc-shaped notch 30 in the recording surface 22c on the left side, the curvature radius R of the arc is 1.5 mm (see FIG. 17). Further, in the recording surface 22c on the left side, the width W2m of the thinnest part of the recording surface 22 in the second region 24 is 0.4 mm.

Note that in this example, the curvature radius R (1.5 mm) of the arc is 1.5 times the width (first width W1: 1 mm) of the first region 23. Further, the width (second width W2m: 0.4 mm) corresponding to the part of the second region 24 having the narrowest width is 0.4 times the width (first width W1: 1 mm) of the first region 23.

Figure 18:
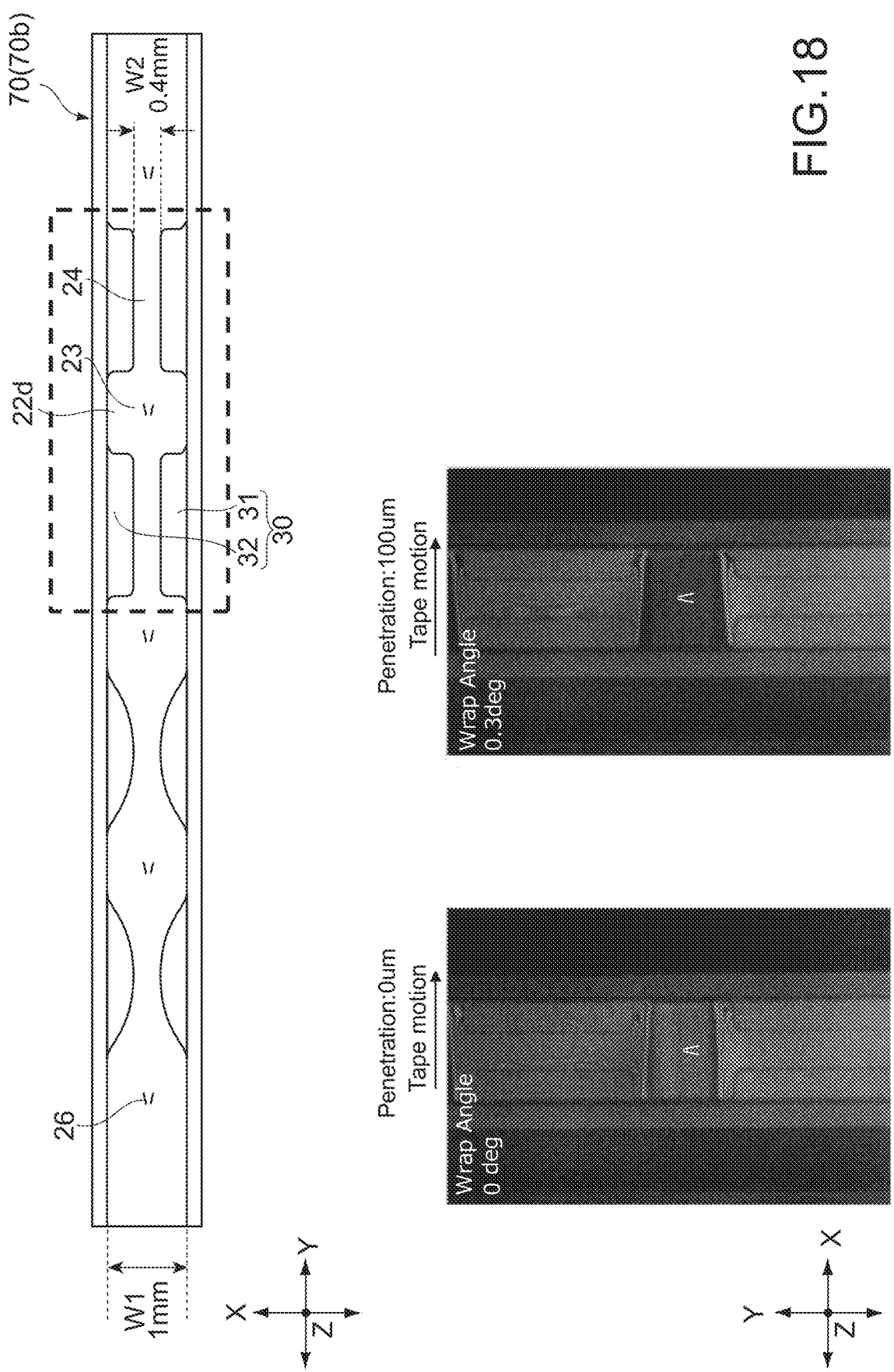
FIG. 18 is a diagram showing an image captured by the imaging unit of the evaluation apparatus.

Meanwhile, in the rectangular notch 30 in the recording surface 22d on the right side, the width of the rectangle is 0.3 mm and the width W2 of the second region 24 of the recording surface 22d is 0.4 mm (see FIG. 18). Note that in this example, the width (second width W2: 0.4 mm) in the second region 24 is 0.4 times the width (first width W1: 1 mm) of the first region 23.

Also the dummy 70c shown at the bottom of FIG. 10 has two types of recording surfaces 22, i.e., a recording surface 22e shown in the left area and a recording surface 22f shown in the right area. In the two types of recording surfaces 22e and 22f, the shape of the notch 30 for forming the second region 24 is common in an arc shape continuous in the longitudinal direction (see the bottom of FIG. 11), but the number of arcs, the curvature radius R, and the like differ.

Figure 19:
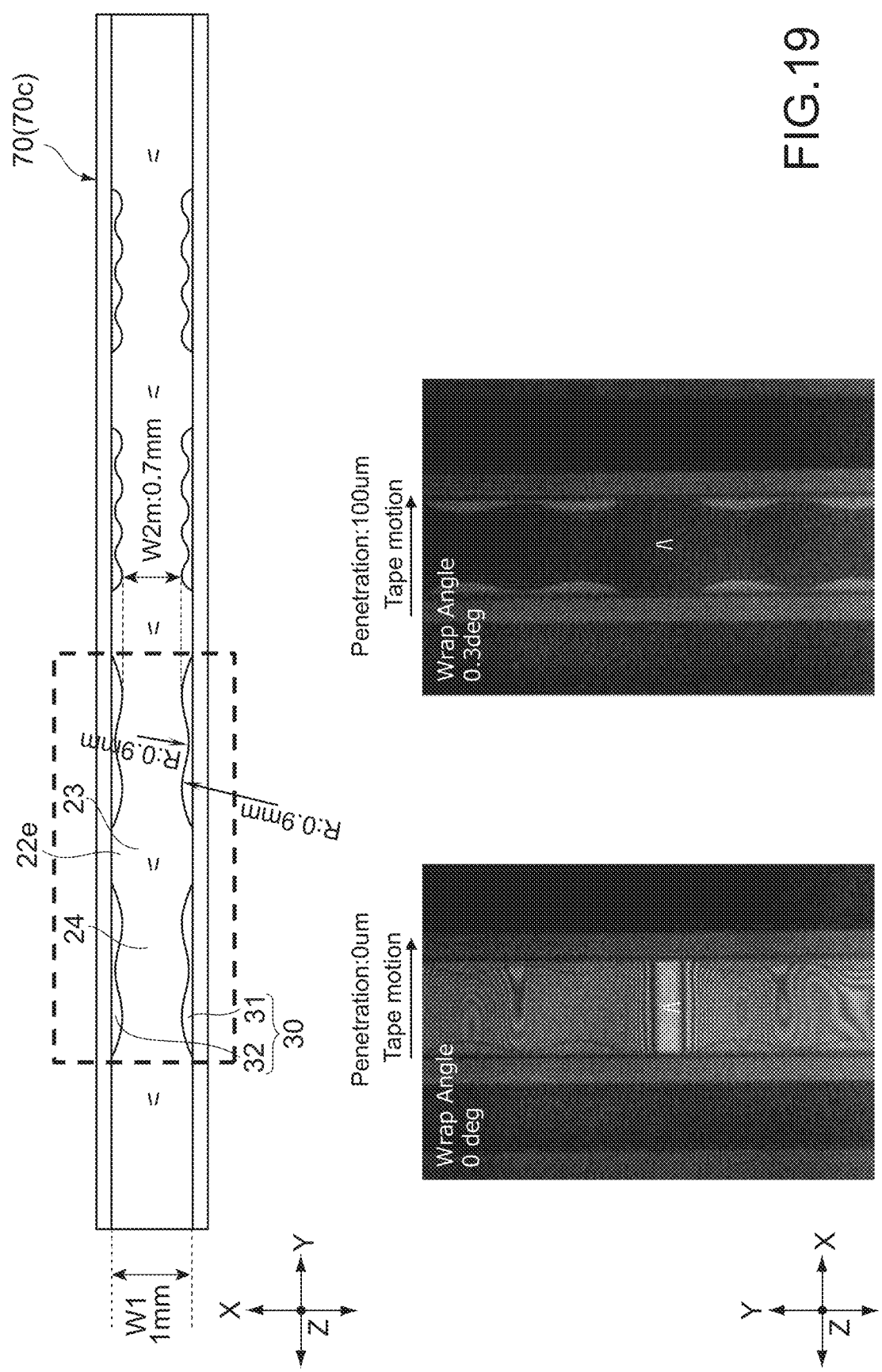
FIG. 19 is a diagram showing an image captured by the imaging unit of the evaluation apparatus.

In the notch 30 having the continuous arc shape in the recording surface 22e on the left side, the number of continuous arcs is two (see FIG. 19). The curvature radius R of this arc is 0.9 mm. Further, in the part where adjacent two arcs are connected to each other, an inverted arc is formed with respect to the side of the second region 24 on the recording surface 22. The curvature radius R of the inverted arc is 0.9 mm. Further, in the recording surface 22e on the left side, the width W2m of the narrowest part of the recording surface 22e in the second region 24 is 0.7 mm.

Note that in this example, the curvature radius R (0.9 mm) of the arc is 0.9 times the width (first width W1: 1 mm) of the first region 23. Further, the width (second width W2m: 0.7 mm) corresponding to the part of the second region 24 having the narrowest width is 0.7 times the width (first width W1: 1 mm) of the first region 23.

Figure 20:
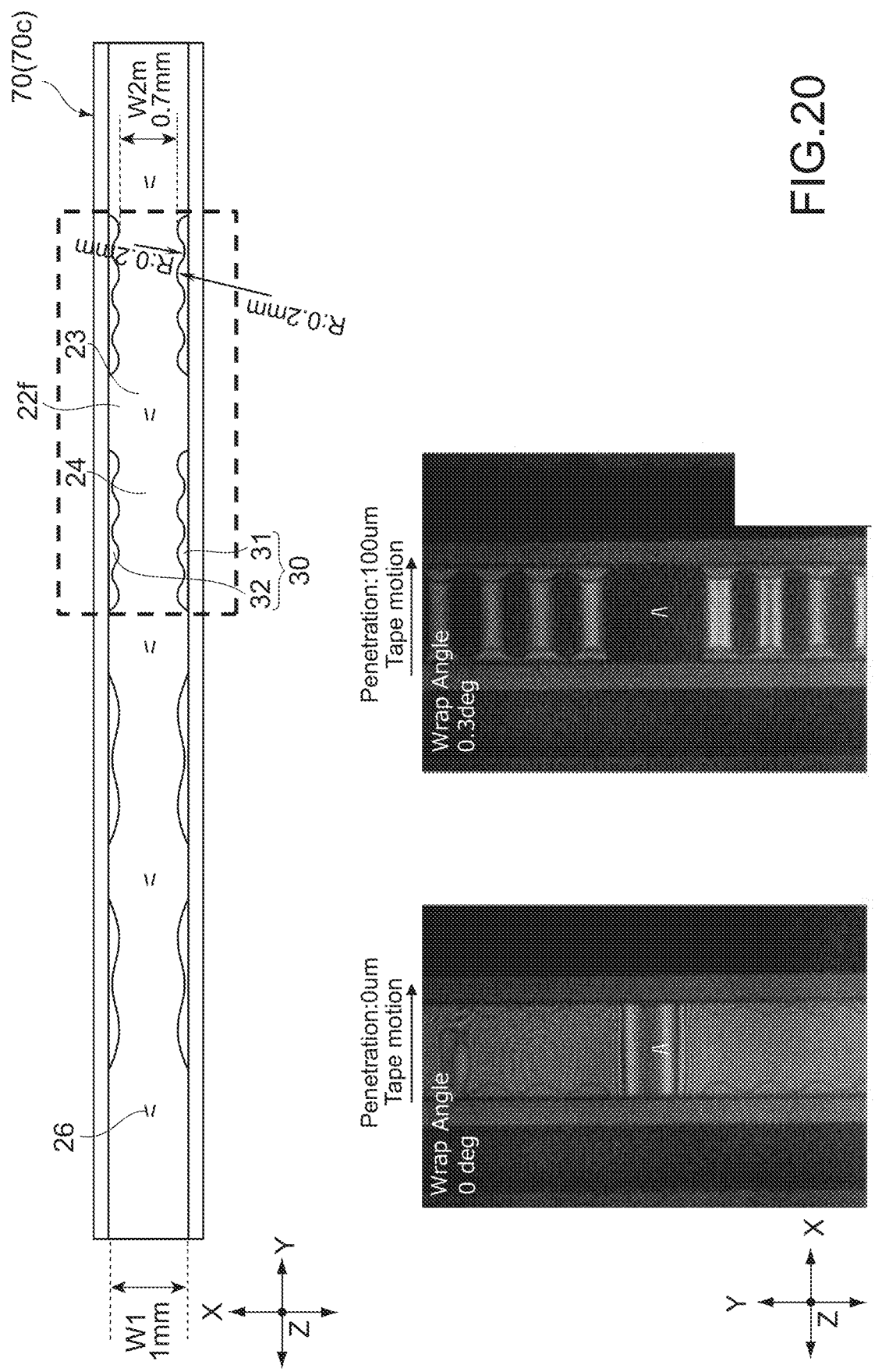
FIG. 20 is a diagram showing an image captured by the imaging unit of the evaluation apparatus.

In the notch 30 having the continuous arc shape in the recording surface 22f on the right side, the number of continuous arcs is four (see FIG. 20). The curvature radius R of this arc is 0.2 mm. Further, in the part where adjacent two arcs are connected to each other, an inverted arc is formed with respect to the side of the second region 24 on the recording surface 22. The curvature radius R of this inverted arc is 0.2 mm. Further, in the recording surface 22f on the right side, the width W2m of the thinnest part of the recording surface 22f in the second region 24 is 0.7 mm.

Note that in this example, the curvature radius R (0.2 mm) of the arc is 0.2 times the width (first width W1: 1 mm) of the first region 23. Further, the width (second width W2m: 0.7 mm) corresponding to the part of the second region 24 having the narrowest width is 0.7 times the width (first width W1: 1 mm) of the first region 23.

Figure 12:
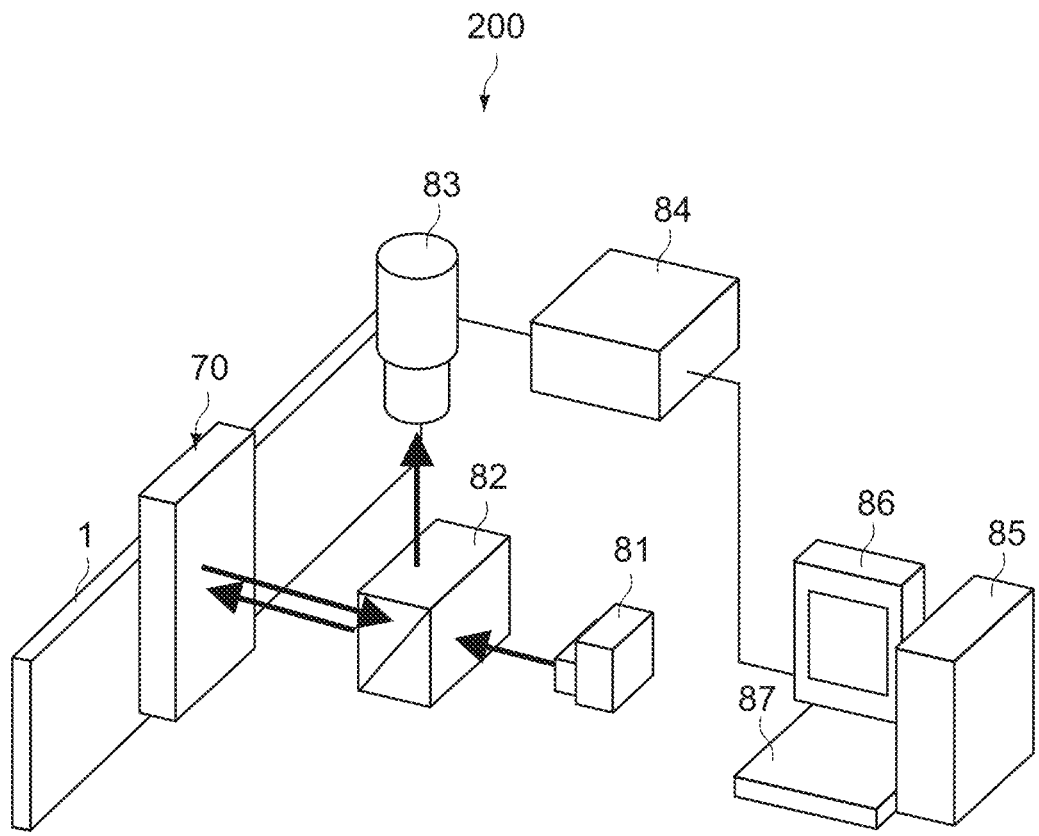
FIG. 12 is a schematic diagram showing an evaluation apparatus for evaluating the contact state between the recording surface and the magnetic tape that travels.
Figure 12:
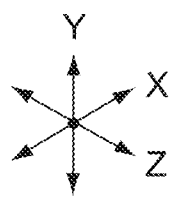

FIG. 12 is a schematic diagram showing the evaluation apparatus 200 for evaluating the contact state between the recording surface 22 and the travelling magnetic tape 1.

As shown in FIG. 12, the evaluation apparatus 200 includes a light source 81, a beam splitter 82, an imaging unit 83, an amplification unit 84, a control device 85, a display unit 86, and an input unit 87.

The light source 81 is configured to be capable of emitting monochromatic light in a specific wavelength range (e.g., red). The beam splitter 82 guides the reflected light reflected by the dummy 70 and the magnetic tape 1 to the side of the imaging unit 83 while causing the light emitted from the light source 81 to be transmitted therethrough.

The imaging unit 83 captures an image by the reflected light of the dummy 70 and the magnetic tape 1. The amplification unit 84 amplifies the signal of the image captured by the imaging unit 83 and outputs the amplified signal to the control device 85.

The control device 85 includes, for example, a control unit, a storage unit, a communication unit, and the like. The control unit includes, for example, a CPU (Central Processing Unit) and the like, and integrally controls the respective units of the evaluation apparatus 200 in accordance with the program stored in the storage unit.

The storage unit includes a non-volatile memory on which various types of data and various programs are to be recorded, and a volatile memory used as a work area of the control unit. The above-mentioned various programs may be read from a portable recording medium such as an optical disc and a semiconductor memory, or may be downloaded from a server apparatus on a network. The communication unit is configured to be capable of communicating with another apparatus such as a server apparatus.

The display unit 86 includes, for example, a liquid crystal display, an EL (Electro-Luminescence) display, or the like, and displays, in response to an instruction from the control device 85, an image captured by the imaging unit 83 on the display. The input unit 87 is, for example, a keyboard, a touch sensor, or the like, input various instructions from a user, and outputs the input instructions to the control device 87.

Now, the movement of light will be described. First, the light emitted from the light source 81 passes through the beam splitter 82 and enters the dummy 70 from the back side of the dummy 70 (side opposite to the recording surface 22). The light that has entered the dummy 70 is partially reflected by the recording surface 22. Further, the other part of the light that has entered the dummy 70 is transmitted through the recording surface 22 and is reflected by the magnetic tape 1. The light reflected by the recording surface 22 and the magnetic tape 1 is guided to the side of the imaging unit 83 by the beam splitter 82, and the imaging unit 83 captures an image.

In the case where there is a distance between the recording surface 22 and the magnetic tape 1, the reflected light by the recording surface 22 and the reflected light by the magnetic tape 1 strengthen or weaken each other depending on this distance, and thus, interference fringes appear in the image captured by the imaging unit 83.

Figure 13:
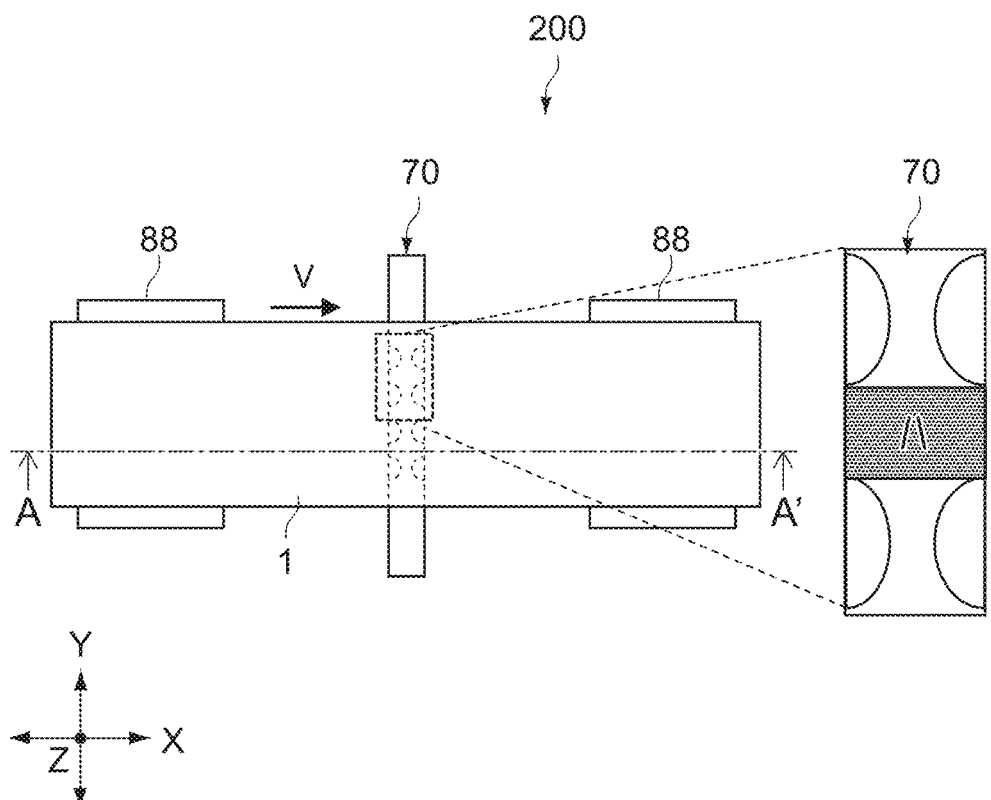
FIG. 13 is an enlarged view showing the relationship between the dummy and the magnetic tape in the evaluation apparatus.
Figure 14:
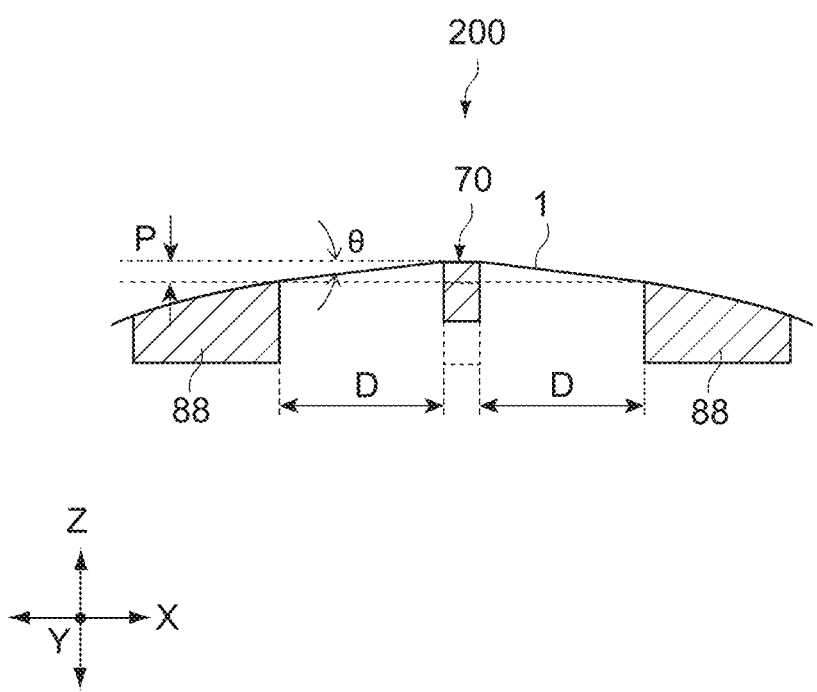
FIG. 14 is a cross-sectional view taken along the line A-A' shown in FIG. 13.

FIG. 13 is an enlarged view showing the relationship between the dummy 70 and the magnetic tape 1 in the evaluation apparatus 200. A state of the evaluation apparatus 200 as viewed from the side of the magnetic tape 1 is shown on the left side of FIG. 13. Further, a state of an image obtained by imaging the dummy 70 and the magnetic tape 1 is shown on the right side of FIG. 13. FIG. 14 is a cross-sectional view taken along the line A-A' shown in FIG. 13.

As shown in FIG. 13 and FIG. 14, the evaluation apparatus 200 includes guides 88 for guiding the magnetic tape 1, in addition to the respective units shown in FIG. 12. Note that although illustration is omitted, the evaluation apparatus 200 includes also a drive device for causing the magnetic tape 1 to travel, a dummy moving mechanism for causing the dummy 70 to move toward the side of the magnetic tape 1, and the like.

The two guides 88 are disposed at positions sandwiching the dummy 70 with a predetermined distance from the dummy 70 in the width direction (X axis direction: travelling direction of the magnetic tape 1) of the dummy 70. A distance D between the dummy 70 and the guides 88 is 19.5 mm in this embodiment.

The dummy 70 is capable of moving in the thickness direction (Z axis direction) of the dummy 70 by the dummy moving mechanism, and protruding toward the side of the magnetic tape 1. Note that the distance that the dummy 70 projects toward the side of the magnetic tape 1 to enter the side of the magnetic tape 1 will be referred to as the entering distance P, hereinafter. The entering distance P is based on the position of the dummy 70 (entering distance P=0) when the magnetic tape 1 is flat and the flat magnetic tape 1 is in contact with the dummy 70.

Further, the angle between the recording surface 22 of the dummy 70 and the magnetic tape 1 as viewed from the longitudinal direction (Y axis direction: width direction of the magnetic tape 1) of the dummy 70 will be referred to as the wrap angle θ (not the part of the magnetic tape 1 facing the recording surface 22 but parts on both sides sandwiching the part facing the recording surface 22 in the travelling direction of the magnetic tape 1), hereinafter. Note that in the case where the entering distance P is zero, the wrap angle θ is 0°.

Note that a speed V at which the magnetic tape 1 is caused to travel is 10 m/s in this embodiment.

FIG. 15 to FIG. 20 are each a diagram showing an image captured by the imaging unit 83 of the evaluation apparatus 200. In FIG. 15 to FIG. 20, the region surrounded by a rectangular broken line in the dummy 70 shown at the top corresponds to the region of an image shown at the bottom.

FIG. 15 shows an image obtained by imaging the recording surface 22a and the magnetic tape 1. Note that although the magnetic gap 26 is drawn to show the position of the magnetic gap 26 in the captured image, the magnetic gap 26 is not actually shown in the image (the same applies to FIG. 16 to FIG. 20).

FIG. 15 includes two images. Of the two images, the image on the left side is an image captured with the entering distance P set to zero and the wrap angle θ set to 0°. Meanwhile, the image on the right side is an image captured with the entering distance P set to 100 μm and the wrap angle θ set to 0.3°.

In the example of the image (the entering distance P of 0, the wrap angle θ of 0°) on the left side of FIG. 15, the part of the recording surface 22 corresponding to the first region 23 is black in substantially the entire regions. This represents that the magnetic tape 1 is in flat contact with the first region 23 of the recording surface 22 in substantially the entire regions. Meanwhile, in the example of the image on the left side, interference fringes appear in the part of the recording surface 22 corresponding to the second region 24 in substantially the entire regions. This represents that the magnetic tape 1 is not contact with the second region 24 of the recording surface 22 in substantially the entire regions and the magnetic tape 1 floats.

Note that the interference fringes indicate so-called contour lines. The interference fringes in the second region 24 will be specifically described. The magnetic tape 1 is farthest from the recording surface 22 in the center portion of the second region 24 in the longitudinal direction (Y axis direction), and gradually approaches the recording surface 22 as it approaches the side of both ends of the second region 24 in the longitudinal direction.

Note that it is conceivable that the magnetic tape 1 floats above the second region 24 of the recording surface 22 for the following reasons. First, when the magnetic tape 1 travels, a slight air flow is generated in the travelling direction by the air layer attached to the magnetic tape 1. The notches 30 for forming the second region 24 is provided in the facing portion 21, and the airflow flows into the notch 31 (on the left side in the image) located on the upstream side in the tape travelling direction, of the notches 30.

The airflow that has flowed into the notch 31 on the upstream side of the tape travelling direction enters between the second region 24 of the recording surface 22 and the magnetic tape 1, which causes the magnetic tape 1 to float above the second region 24 of the recording surface 22. After causing the magnetic tape 1 to float, this airflow flows into the notch 32 on the downstream side of the tape travelling direction to be discharged to the outside. The magnetic tape 1 floats for such a reason.

Note that it is conceivable that the airflow is likely to enter between the second region 24 of the recording surface 22 and the magnetic tape 1 because the path of the airflow gradually narrows toward the direction of the airflow by forming the notches 30 (particularly, the notch 31 on the upstream side of the travelling direction of the magnetic tape 1) to have an arc shape.

In the example of the image on the left side of FIG. 15, since the magnetic tape 1 is in flat contact with the first region 23 of the recording surface 22 in substantially the entire regions, it is possible to record the servo pattern 7 on the magnetic gap 26 more appropriately. Further, in the example of the image on the left side, since the magnetic tape 1 floats above the second region 24 of the recording surface 22 in substantially the entire regions, it is possible to reduce the influence due to the friction between the magnetic tape 1 and the recording surface 22 and improve the recording accuracy of the servo pattern 7.

In the example of the image (the entering distance P of 100 μm, the wrap angle θ of 0.3°) on the right side of FIG. 15, the part of the recording surface 22 corresponding to the first region 23 and the part of the recording surface 22 corresponding to the second region 24 are black in substantially the entire regions. This represents that the magnetic tape 1 is in flat contact with the first region 23 and the second region 24 of the recording surface 22 in substantially the entire regions.

In the case of the example of the image on the right side of FIG. 15, the magnetic tape 1 does not float above the second region 24 of the recording surface 22 because the entering distance P and the wrap angle θ have been increased. For this reason, the effect of reducing friction is smaller than that in the example of the image on the left side of FIG. 15. However, also in the example of the image on the right side of FIG. 15, the width of the recording surface 22 is narrowed in the second region 24. For this reason, the friction with the magnetic tape 1 is less than that in the general recording surface 22 having a rectangular shape. Therefore, it is possible to reduce the influence due to the friction between the magnetic tape 1 and the recording surface 22 and improve the recording accuracy of the servo pattern 7.

Note that by setting the speed V at which the magnetic tape 1 travels higher than 10 m/s, the airflow will be strengthened, and thus, it is conceivable that the magnetic tape 1 can be appropriately caused to float above the second region 24 while appropriately causing the magnetic tape 1 to be appropriately in contact with the first region 23 even under the conditions of the entering distance P of 100 μm and the wrap angle θ of 0.3°.

FIG. 16 shows an image obtained by imaging the recording surface 22b and the magnetic tape 1. FIG. 16 includes two images. Of the two images, the image on the left side is an image captured with the entering distance P set to zero and the wrap angle θ to 0°. Further, the image on the right side is an image captured with the entering distance P set to 200 μm and the wrap angle θ set to 0.6°.

In the example of the image (the entering distance P of 0, the wrap angle θ of 0°) on the left side of FIG. 16, interference fringes appear in the part of the recording surface 22 corresponding to the first region 23 although the space between the fringes is wide. This represents that the magnetic tape 1 is not in flat contact with the first region 23 of the recording surface 22 and partially floats.

Further, in the example of the image on the left side of FIG. 16, interference fringes appear the part of the recording surface 22 corresponding to the second region 24 in substantially the entire regions. This represents that the magnetic tape 1 is not in contact with the second region 24 of the recording surface 22 in substantially the entire regions and the magnetic tape 1 floats.

In the case of the example of the image on the left side of FIG. 16, the magnetic tape 1 well floats above the second region 24, which is favorable in this respect. Meanwhile, since the magnetic tape 1 is not in flat contact with the first region 23, there is a possibility that the servo pattern 7 cannot be recorded on the magnetic gap 26 more appropriately.

It is conceivable that the magnetic tape 1 partially floats above the first region 23 because the airflow that has entered between the magnetic tape 1 and the second region 24 causes the magnetic tape 1 to float above the first region 23. Note that by setting the speed V at which the magnetic tape 1 travels lower than 10 m/s, the airflow will be weakened, and thus, it is conceivable that the magnetic tape 1 can be appropriately caused to float above the second region 24 while appropriately causing the magnetic tape 1 to be appropriately in contact with the first region 23 even under the conditions of the entering distance P of zero and the wrap angle θ of 0°.

In the example of the image (the entering distance P of 200 μm, the wrap angle θ of 0.6°) on the right side of FIG. 16, the part of the recording surface 22 corresponding to the first region 23 is black in substantially the entire regions. This represents that the magnetic tape 1 is in flat contact with the first region 23 of the recording surface 22 in substantially the entire regions. Meanwhile, in the example of the image on the right side, interference fringes appear in the part of the recording surface 22 corresponding to the second region 24 in substantially the entire regions. This represents that the magnetic tape 1 is not in contact with the second region 24 of the recording surface 22 in substantially the entire regions and the magnetic tape 1 floats.

In the example of the image on the right side of FIG. 16, it is possible to cause the magnetic tape 1 to appropriately float above the second region 24 (with a large floating distance) while causing the magnetic tape 1 to be appropriately in contact with the first region 23.

FIG. 17 shows an image obtained by imaging the recording surface 22c and the magnetic tape 1. FIG. 17 includes two images. Of the two images, the image on the left side is an image captured with the entering distance P set to zero and the wrap angle θ set to 0°. Further, the image on the right side is an image captured with the entering distance P of 200 μm and the wrap angle θ of 0.6°.

The example of the two images in FIG. 17 is similar to the example of the example of the two images in FIG. 16 and is basically the same as the example of the two images in FIG. 16. Therefore, in the description of the two images in FIG. 17, the different from FIG. 16 will be mainly described.

Here, in the recording surface 22c shown in FIG. 17, the curvature radius R of the notch 30 for forming the second region 24 is smaller (the recording surface 22b: 2.1 mm, the recording surface 22c: 1.5 mm) and the width W2m of the part of the second region 24 having the narrowest width is smaller (the recording surface 22b: 0.6 mm, the recording surface 22c: 0.4 mm) than that in the recording surface 22b shown in FIG. 16.

For this reason, in the recording surface 22c shown in FIG. 17, the airflow is likely to enter the region between the second region 24 and the magnetic tape 1 as compared with the recording surface 22b shown in FIG. 16. For this reason, in the recording surface 22c shown in FIG. 17, the floating region of the magnetic tape 1 above the second region 24 in the case where the entering distance P and the wrap angle θ have been set to the same values is slightly larger than that in the recording surface 22b shown in FIG. 16.

For example, comparing the image on the right side of FIG. 17 and the image on the right side of FIG. 16, it can be seen that the region of the interference fringes in the second region 24 in the image of FIG. 17 is slightly larger than the region of the interference fringes in the second region 24 in the image of FIG. 16.

FIG. 18 includes an image obtained by imaging the recording surface 22d and the magnetic tape 1. FIG. 18 includes two images. Of the two images, the image on the left side is an image captured with the entering distance P set to zero and the wrap angle θ set to 0°. Further, the image on the right side is an image captured with the entering distance P set to 100 μm and the wrap angle θ set to 0.3°.

In the example of the image (the entering distance P of 0, the wrap angle θ of 0°) on the left side of FIG. 18, interference fringes appear in the part of the recording surface 22 corresponding to the first region 23 although the space between the fringes is wide. This represents that the magnetic tape 1 is not in flat contact with the first region 23 of the recording surface 22 and partially floats.

Further, in the examples of the image on the left side of FIG. 18, interference fringes appear in the part of the recording surface 22 corresponding to the second region 24 in substantially the entire regions. This represents that the magnetic tape 1 is not in contact with the second region 24 of the recording surface 22 in the entire regions and the magnetic tape 1 floats.

In the case of the example of the image on the left side of FIG. 18, the magnetic tape 1 well floats above the second region 24, which is favorable in this respect. Meanwhile, since the magnetic tape 1 is not in flat contact with the first region 23, there is a possibility that the servo pattern 7 cannot be recorded on the magnetic gap 26 more appropriately.

Note that by setting the speed V at which the magnetic tape 1 travels lower than 10 m/s, the airflow will be weakened, and thus, it is conceivable that the magnetic tape 1 can be appropriately caused to float above the second region 24 while appropriately causing the magnetic tape 1 to be appropriately in contact with the first region 23 even under the conditions of the entering distance P of zero and the wrap angle θ of 0°.

In the examples of the image (the entering distance P of 100 μm, the wrap angle θ of 0.3°) on the right side of FIG. 18, the part of the recording surface 22 corresponding to the first region 23 is black in substantially the entire regions. This represents that the magnetic tape 1 is in flat contact with the first region 23 of the recording surface 22 in substantially the entire regions. Meanwhile, in the example of the image on the right side, interference fringes appear in the part of the recording surface 22 corresponding to the second region 24 in substantially the entire regions. This represents that the magnetic tape 1 is not in contact with the second region 24 of the recording surface 22 in the entire regions and the magnetic tape 1 floats.

In the example of the image on the right side of FIG. 18, it is possible to cause the magnetic tape 1 to appropriately float above the second region 24 (with a large floating distance) while causing the magnetic tape 1 to be appropriately in contact with the first region 23.

FIG. 19 shows an image obtained by imaging the recording surface 22e and the magnetic tape 1. FIG. 19 includes two images. Of the two images, the image on the left side is an image captured with the entering distance P set to zero and the wrap angle θ set to 0°. Further, the image on the right side is an image captured with the entering distance P set to 100 μm and the wrap angle θ set to 0.3°.

In the example of the image (the entering distance P of 0, the wrap angle θ of 0°) on the left side of FIG. 19, interference fringes appear in the part of the recording surface 22 corresponding to the first region 23 although the space between the fringes is wide. This represents that the magnetic tape 1 is not in flat contact with the first region 23 of the recording surface 22 and partially floats.

Further, in the example of the image on the left side of FIG. 19, interference fringes appear in the part of the recording surface 22 corresponding to the second region 24 in substantially the entire regions. This represents that the magnetic tape 1 is not in contact with the second region 24 of the recording surface 22 in the entire regions and the magnetic tape 1 floats.

In the case of the example of the image on the left side of FIG. 19, the magnetic tape 1 floats above the second region 24, which is favorable. Meanwhile, since the magnetic tape 1 is not in flat contact with the first region 23, there is a possibility that the servo pattern 7 cannot be recorded on the magnetic gap 26 more appropriately.

Note that by setting the speed V at which the magnetic tape 1 travels lower than 10 m/s, the airflow will be weakened, and thus, it is conceivable that the magnetic tape 1 can be appropriately caused to float above the second region 24 while appropriately causing the magnetic tape 1 to be appropriately in contact with the first region 23 even under the conditions of the entering distance P of zero and the wrap angle θ of 0°.

In the example of the image (the entering distance P of 100 μm, the wrap angle θ of 0.3°) on the right side of FIG. 19, the part of the recording surface 22 corresponding to the first region 23 and the part of the recording surface 22 corresponding to the second region 24 are black in substantially the entire regions. This represents that the magnetic tape 1 is in flat contact with the first region 23 of the recording surface 22 and the second region 24 of the recording surface 22 in substantially the entire regions.

In the case of the example of the image on the right side of FIG. 19, the magnetic tape 1 does not float above the second region 24 of the recording surface 22 because the entering distance P and the wrap angle θ have been increased. However, also in the example of the image on the right side of FIG. 19, the width of the recording surface 22 is narrower in the second region 24. For this reason, the friction with the magnetic tape 1 is less than that in the general recording surface 22 having a rectangular shape. Therefore, it is possible to reduce the influence due to the friction between the magnetic tape 1 and the recording surface 22 and improve the recording accuracy of the servo pattern 7.

Note that by setting the travelling speed of the magnetic tape 1 higher than 10 m/s, the airflow is strengthened, and thus, it is conceivable that the magnetic tape 1 can be appropriately caused to float above the second region 24 while appropriately causing the magnetic tape 1 to be appropriately in contact with the first region 23 even under the conditions of the entering distance P of 100 μm and the wrap angle θ of 0.3°.

FIG. 20 shows the image obtained by imaging the recording surface 22f and the magnetic tape 1. FIG. 20 includes two images. Of the two images, the image on the left side is an image captured with the entering distance P set to zero and the wrap angle θ set to 0°. Further, the image on the right side is an image captured with the entering distance P set to 100 μm and the wrap angle θ set to 0.3°.

In the examples of the image (the entering distance P of 0, the wrap angle θ of 0°) on the left side of FIG. 20, interference fringes appear in the part of the recording surface 22 corresponding to the first region 23 although the space between the fringes is wide. This represents that the magnetic tape 1 is not in flat contact with the first region 23 of the recording surface 22 and partially floats.

Further, in the example of the image on the left side of FIG. 20, interference fringes appear in the part of the recording surface 22 corresponding to the second region 24 in substantially the entire regions. This represents that the magnetic tape 1 is not in contact with the second region 24 of the recording surface 22 in the entire regions and the magnetic tape 1 floats.

In the case of the example of the image on the left side of FIG. 20, the magnetic tape 1 well floats above the second region 24, which is favorable in this respect. Meanwhile, since the magnetic tape 1 is not in flat contact with the first region 23, there is a possibility that the servo pattern 7 cannot be recorded on the magnetic gap 26 more appropriately.

Note that by setting the speed V at which the magnetic tape 1 travels lower than 10 m/s, the airflow will be weakened, and thus, it is conceivable that the magnetic tape 1 can be appropriately caused to float above the second region 24 while appropriately causing the magnetic tape 1 to be appropriately in contact with the first region 23 even under the conditions of the entering distance P of zero and the wrap angle θ of 0°.

In the example of the image (the entering distance P of 100 μm, the wrap angle θ of 0.3°) on the right side of FIG. 20, the part of the recording surface 22 corresponding to the first region 23 is black in substantially the entire regions.

This represents that the magnetic tape 1 is in flat contact with the first region 23 of the recording surface 22 in substantially the entire regions.

Meanwhile, in the example of the image on the right side, the part of the recording surface 22 corresponding to the second region 24 is black for the place where the width the second region 24 is widened, and interference fringes appear for the place where the width of the second region 24 is narrowed. This represents that the magnetic tape 1 is in contact with the part of the second region 24 where that width is widened but is not contact with the part of the second region 24 where the width is narrowed, and floats.

In the case of the example of the image on the right side of FIG. 20, it is possible to cause the magnetic tape 1 to partially float above the second region 24 while causing the magnetic tape 1 to be appropriately in contact with the first region 23.

Here, comparing the example of the image on the right side of FIG. 19 and the example of the image on the right side of FIG. 20, the conditions of the entering distance P of 100 μm and the wrap angle θ of 0.3° are the same in these examples. In the example of the image of FIG. 19, the floating region of the magnetic tape 1 above the second region 24 disappears under the conditions of the entering distance P of 100 μm and the wrap angle θ of 0.3°. Meanwhile, in the example of the image on the right side of FIG. 20, the floating region of the magnetic tape 1 above the second region 24 does not disappear under the conditions of the entering distance P of 100 μm and the wrap angle θ of 0.3°.

This is because the curvature radius R of the notch 30 for forming the second region 24 in the recording surface 22f shown in FIG. 20 is smaller (the recording surface 22e: 0.9 mm, the recording surface 22f: 0.2 mm) than that in the recording surface 22e shown in FIG. 19, and the airflow is likely to partially enter the region between the second region 24 and the magnetic tape 1 in the recording surface 22f shown in FIG. 20 as compared with the recording surface 22e shown in FIG. 19.

Note that although the dummy 70 is used instead of the upper part of the head block 20 for evaluating the contact state for the sake of convenience, the shape and the like (i.e., those excluding the material) of the dummy 70 described above are all applicable to the above-mentioned head block 20.

<Effect, Etc.>

In this embodiment, since the second width W2 in the second region 24 of the recording surface 22 is narrower than the first width W1 in the first region 23 of the recording surface 22, it is possible to reduce the friction between the recording surface 22 of the servo write head 13 and the magnetic tape 1. As a result, since it is possible to make the flow of the magnetic tape 1 with respect to the recording surface 22 smooth, and thus, improve the recording accuracy of the servo pattern 7.

Further, by causing the magnetic tape 1 to at least partially float above the second region 24, it is possible to further reduce the friction between the recording surface 22 of the servo write head 13 and the magnetic tape 1. As a result, it is possible to make the flow of the magnetic tape 1 with respect to the recording surface 22 smoother, and thus, further improve the recording accuracy of the servo pattern 7.

Further, by causing the magnetic tape 1 to at least partially float above the second region 24 while being in contact with the first region 23, it is possible to satisfy both the following (1) and (2). (1) The servo pattern 7 is recorded on the magnetic gap 26 more appropriately. (2) The friction between the recording surface 22 of the servo write head 13 and the magnetic tape 1 is reduced to improve the recording accuracy of the servo pattern 7.

Further, the second region 24 in the recording surface 22 is formed such that the recording surface 22 is notched in a predetermined shape by the notch 30 in the width direction (on the side of both ends in the width direction). As this shape (predetermined shape) of the notch 30, various shapes such as an arc, a rectangle, and an arc continuous in the longitudinal direction can be used.

In particular, in the case where an arc is used as the shape (predetermined shape) of the notch 30, the airflow is likely to enter between the second region 24 of the recording surface 22 and the magnetic tape 1 because the path of the airflow gradually narrows toward the direction of the airflow. For this reason, the effect of causing the magnetic tape 1 to float above the second region 24 is increased.

Further, in the case where an arc is used as the shape (predetermined shape) of the notch 30, the second width W2 corresponding to the part of the second region 24 having the narrowest width is, for example, 0.8 times or less, 0.6 times or less, 0.4 times or less, or 0.3 or less the first width W1 in the first region 23.

Here, as the ratio of the second width W2 (part having the narrowest width) to the first width W1 decreases, the airflow is more likely to pass between the second region 24 and the magnetic tape 1, and thus, it is possible to cause the magnetic tape 1 to float above the second region 24 more easily. Further, as the ratio of the second width W2 (part having the narrowest width) to the first width W1 decreases, the area of the second region 24 decreases, and thus, it is possible to reduce the influence due to the friction even if the magnetic tape 1 is in contact with the second region 24.

In the case where an arc is used as the shape (predetermined shape) of the notch 30, the curvature radius R of the arc is, for example, 4.1 times or less, 2.2 times or less the first width W1, 2.1 times or less the first width W1, or 1.5 times or less the first width W1.

As the ratio of the length of the curvature radius R of the arc to the first width W1 decreases, it is possible to cause the magnetic tape 1 to float above the second region 24 more easily because the path of the airflow sharply narrows. Note that in the case where the ratio of the length of the curvature radius R of the arc to the first width W1 is lowered too much, the length of the second region 24 is shortened, and thus, this ratio is set in consideration of this point.

Note that in the case where the ratio of the length of the curvature radius R of the arc to the first width W1 is reduced (e.g., 0.9 times or less), for example, an arc continuous in the longitudinal direction may be used as the above-mentioned predetermined shape.

Various Modified Examples

In the above description, the case where the shape of the notch 30 is an arc, a rectangle, or an arc continuous in the longitudinal direction has been described. Meanwhile, the shape of the notch 30 is not limited thereto. For example, the shape of the notch 30 may be an elliptical arc, a trapezoid, or a polygon such as a triangle and a pentagon. Further, the shape of the notch 30 may be a shape in which elliptical arcs, trapezoids, polygons, or the like are continuously arranged in the longitudinal direction.

In the above description, the case where the notch 30 is provided on both the upstream side and the downstream side of the magnetic tape 1 in the travelling direction has been described. Meanwhile, the notch 30 may be provided on only one of the upstream side and the downstream side of the magnetic tape 1 in the travelling direction. Note that in the case where the notch 30 is provided on the upstream side of the magnetic tape 1 in the traveling direction, it is possible to cause the airflow to be appropriately flow between the second region 24 and the magnetic tape 1, and cause the magnetic tape 1 to appropriately float above the second region 24.

It should be noted that the present technology may take the following configurations.

(1) A servo write head, including:
a recording surface that has a first region and a second region, and records a servo pattern on a magnetic tape by a magnetic gap, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

(2) The servo write head according to (1) above, in which the second region is formed such that the recording surface is notched in a predetermined shape in the width direction.

(3) The servo write head according to (2) above, in which the predetermined shape is an arc.

The servo write head according to (3) above, in which the second width corresponding to a part of the second region having the narrowest width is 0.8 times or less the first width.

(5) The servo write head according to (4) above, in which the second width corresponding to the part of the second region having the narrowest width is 0.6 times or less the first width.

(6) The servo write head according to (5) above, in which the second width corresponding to the part of the second region having the narrowest width is 0.4 times or less the first width.

(7) The servo write head according to (6) above, in which the second width corresponding to the part of the second region having the narrowest width is 0.3 times or less the first width.

(8) The servo write head according to (2) above, in which a curvature radius of the arc is 4.1 times or less the first width.

(9) The servo write head according to (8) above, in which the curvature radius of the arc is 2.2 times or less the first width.

(10) The servo write head according to (9) above, in which the curvature radius of the arc is 2.1 times or less the first width.

(11) The servo write head according to (10) above, in which the curvature radius of the arc is 1.5 times or less the first width.

(12) The servo write head according to (2) above, in which the predetermined shape is an arc continuous in the longitudinal direction.

(13) The servo write head according to (2) above, in which the predetermined shape is a rectangle.

(14) The servo write head according to any one of (1) to (13) above, in which the magnetic tape at least partially floats above the second region.

(15) The servo write head according to (14) above, in which the magnetic tape at least partially floats above the second region while being in contact with the first region.

(16) A servo pattern recording apparatus, including:
a servo write head having
a recording surface that has a first region and a second region, and records a servo pattern on a magnetic tape by a magnetic gap, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

(17) A method of producing a magnetic tape, including:
recording a servo pattern on a magnetic tape by a magnetic gap in a recording surface of a servo write head, the recording surface having a first region and a second region, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

(18) A magnetic tape on which a servo pattern is recorded by a magnetic gap in a recording surface of a servo write head, the recording surface having a first region and a second region, the first region being formed in with a first width a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

REFERENCE SIGNS LIST 1 magnetic tape
13 servo write head
21 facing portion
22 recording surface
23 first region
24 second region
26 magnetic gap
30 notch
70 dummy
100 servo pattern recording apparatus
200 evaluation apparatus

The invention claimed is:
1. A servo write head, comprising:
a recording surface that has a first region and a second region, and records a servo pattern on a magnetic tape by a magnetic gap, the first region being formed with a first width in a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

2. The servo write head according to claim 1, wherein the second region is formed such that the recording surface is notched in a predetermined shape in the width direction.

3. The servo write head according to claim 2, wherein the predetermined shape is an arc.

4. The servo write head according to claim 3, wherein the second width corresponding to a part of the second region having the narrowest width is 0.8 times or less the first width.

5. The servo write head according to claim 4, wherein the second width corresponding to the part of the second region having the narrowest width is 0.6 times or less the first width.

6. The servo write head according to claim 5, wherein the second width corresponding to the part of the second region having the narrowest width is 0.4 times or less the first width.

7. The servo write head according to claim 6, wherein the second width corresponding to the part of the second region having the narrowest width is 0.3 times or less the first width.

8. The servo write head according to claim 2, wherein a curvature radius of the arc is 4.1 times or less the first width.

9. The servo write head according to claim 8, wherein the curvature radius of the arc is 2.2 times or less the first width.

10. The servo write head according to claim 9, wherein the curvature radius of the arc is 2.1 times or less the first width.

11. The servo write head according to claim 10, wherein the curvature radius of the arc is 1.5 times or less the first width.

12. The servo write head according to claim 2, wherein the predetermined shape is an arc continuous in the longitudinal direction.

13. The servo write head according to claim 2, wherein the predetermined shape is a rectangle.

14. The servo write head according to claim 1, wherein the magnetic tape at least partially floats above the second region.

15. The servo write head according to claim 14, wherein the magnetic tape at least partially floats above the second region while being in contact with the first region.

16. A servo pattern recording apparatus, comprising:
a servo write head having
a recording surface that has a first region and a second region, and records a servo pattern on a magnetic tape by a magnetic gap, the first region being formed with a first width in a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

17. A method of producing a magnetic tape, comprising:
recording a servo pattern on a magnetic tape by a magnetic gap in a recording surface of a servo write head, the recording surface having a first region and a second region, the first region being formed with a first width in a width direction and corresponding to a position where the magnetic gap is provided in a longitudinal direction perpendicular to the width direction, the second region being formed with a second width narrower than the first width and corresponding to a position where no magnetic gap is provided in the longitudinal direction.

* * * * *